(12) United States Patent
Siomina et al.

(10) Patent No.: US 10,548,181 B2
(45) Date of Patent: Jan. 28, 2020

(54) METHODS AND APPARATUS FOR CELL VERIFICATION UNDER UE EDRX

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/074,347

(22) PCT Filed: Jan. 31, 2017

(86) PCT No.: PCT/IB2017/050517
§ 371 (c)(1),
(2) Date: Jul. 31, 2018

(87) PCT Pub. No.: WO2017/134561
PCT Pub. Date: Aug. 10, 2017

(65) Prior Publication Data
US 2019/0313475 A1 Oct. 10, 2019

Related U.S. Application Data

(60) Provisional application No. 62/289,522, filed on Feb. 1, 2016.

(51) Int. Cl.
*H04W 76/28* (2018.01)
*H04W 48/16* (2009.01)
*H04W 24/10* (2009.01)

(52) U.S. Cl.
CPC .......... *H04W 76/28* (2018.02); *H04W 24/10* (2013.01); *H04W 48/16* (2013.01)

(58) Field of Classification Search
CPC ...... H04W 76/28; H04W 24/10; H04W 48/16
See application file for complete search history.

(56) References Cited

U.S. PATENT DOCUMENTS

| 2008/0160918 A1 | 7/2008 | Jeong et al. |
| 2012/0218934 A1 | 8/2012 | Takehana et al. |
| 2014/0307603 A1 | 10/2014 | Barany |

OTHER PUBLICATIONS

Author Unknown, "Technical Specification Group GSM/EDGE Radio Access Network; Study on power saving for Machine-Type Communication (MTC) devices (Release 13)," Technical Report 43.869, Version 13.0.0, 3GPP Organizational Partners, Aug. 2015, 35 pages.

(Continued)

*Primary Examiner* — Walter J Divito
(74) *Attorney, Agent, or Firm* — Withrow & Terranova, PLLC

(57) ABSTRACT

Systems and methods for cell verification for a wireless device configured to operate under extended Discontinuous Reception (eDRX) are disclosed. In some embodiments, a method of operation of a wireless communication device configured to operate with an eDRX cycle comprises acquiring a first identifier of at least one first cell during a time associated with a first paging time window of the eDRX cycle with which the wireless communication device is configured and acquiring a second identifier of at least one second cell during a time associated with a second paging time window of the eDRX cycle. The method further comprises performing a first type of wireless communication device radio operations if the first identifier is the same as the second identifier and performing a second type of wireless communication device radio operations if the first identifier is different than the second identifier.

17 Claims, 9 Drawing Sheets

(56) References Cited

OTHER PUBLICATIONS

Author Unknown, "Technical Specification Group Radio Access Network; Evolved Universal Terrestrial Radio Access (E-UTRA); Requirements for support of radio resource management (Release 14)," Technical Specification 36.133, Version 14.1.0, 3GPP Organizational Partners, Sep. 2016, 1863 pages.
Ericsson, "R4-157829: Draft CR for extended DRX in UTRA," Change Request of 25.133, Third Generation Partnership Project (3GPP), TSG-RAN WG4 Meeting #77, Nov. 16-20, 2015, 16 pages, Anaheim, USA.
International Search Report and Written Opinion for International Patent Application No. PCT/IB2017/050517, dated Apr. 6, 2017, 15 pages.
Written Opinion for International Patent Application No. PCT/IB2017/050517, dated Jan. 23, 2018, 6 pages.
International Preliminary Report on Patentability for International Patent Application No. PCT/IB2017/050517, dated May 4, 2018, 26 pages.
Intel et al., "S2-134574: Interim conclusion on Relay for Public Safety ProSe," 3GPP TSG-SA WG2 Meeting #100, Nov. 11-15, 2013, San Francisco, CA, USA, 2 pages.
Examination Report for European Patent Application No. 17703804.9, dated Jul. 9, 2019, 7 pages.
Notice of Reasons for Rejection for Japanese Patent Application No. 2018-539876, dated Jul. 9, 2019, 15 pages.
Notice of Preliminary Rejection for Korean Patent Application No. 2018-7023060, dated Jun. 10, 2019, 8 pages.

DRX cycle configuration for non-eDRX (legacy) Ues
(Prior Art)

*DRX in LTE*
*(Prior Art)*

SFN cycle
*(Prior Art)*

Relation between H-SFN, paging window, and eDRX periodicity
*(Prior Art)*

*eDRX in UTRA*
*(Prior Art)*

A shared cell with one macro and a few RRHs all using the same cell ID
(aka PCI)
(Prior Art)

ACQUIRE A FIRST IDENTIFIER (E.G., A FIRST CGI, CGI1) OF AT LEAST ONE FIRST CELL WITH STATUS A1 (E.G., SERVING) DURING ANY TIME ASSOCIATED WITH A FIRST PTW (PTW1) DURATION OF THE CONFIGURED eDRX CYCLE
100

ACQUIRE A THIRD IDENTIFIER OF A FIRST TRANSMITTER (E.G., A FIRST TRANSMIT POINT) WITH STATUS B1 ASSOCIATED WITH THE AT LEAST ONE FIRST CELL DURING ANY TIME ASSOCIATED WITH THE FIRST PTW (PTW1) DURATION OF THE CONFIGURED eDRX CYCLE
100A

ACQUIRE A SECOND IDENTIFIER (E.G., A SECOND CGI, CGI2) OF AT LEAST ONE SECOND CELL WITH STATUS A2 (E.G., STRONGEST) DURING ANY TIME ASSOCIATED WITH A SECOND PTW (PTW2) DURATION OF THE CONFIGURED eDRX CYCLE, WHERE PTW2 OCCURS AFTER PTW1
102

ACQUIRE A FOURTH IDENTIFIER OF A SECOND TRANSMITTER (E.G., A SECOND TRANSMIT POINT) WITH STATUS B2 ASSOCIATED WITH THE AT LEAST ONE SECOND CELL DURING ANY TIME ASSOCIATED WITH THE SECOND PTW (PTW2) DURATION OF THE CONFIGURED eDRX CYCLE
102A

PERFORM A FIRST TYPE OF UE RADIO OPERATIONS IF THE FIRST AND SECOND IDENTIFIERS ARE THE SAME
OR
PERFORM A SECOND TYPE OF UE RADIO OPERATIONS IF THE FIRST AND SECOND IDENTIFIERS ARE DIFFERENT
104

PERFORM A THIRD TYPE OF UE RADIO OPERATIONS IF THE THIRD AND FOURTH IDENTIFIERS ARE THE SAME
OR
PERFORM A FOURTH TYPE OF UE RADIO OPERATIONS IF THE THIRD AND FOURTH IDENTIFIERS ARE DIFFERENT
104A

*FIG. 10*

OBTAIN A FIRST IDENTIFIER (E.G., A FIRST CGI, CGI1) OF AT LEAST ONE FIRST CELL WITH STATUS A1 (E.G., SERVING) DURING ANY TIME ASSOCIATED WITH A FIRST PTW (PTW1) DURATION OF THE CONFIGURED eDRX CYCLE
200

↓

OBTAIN A THIRD IDENTIFIER OF A FIRST TRANSMITTER (E.G., A FIRST TRANSMIT POINT) WITH STATUS B1 ASSOCIATED WITH THE AT LEAST ONE FIRST CELL DURING ANY TIME ASSOCIATED WITH THE FIRST PTW (PTW1) DURATION OF THE CONFIGURED eDRX CYCLE
200A

↓

ACQUIRE A SECOND IDENTIFIER (E.G., A SECOND CGI, CGI2) OF AT LEAST ONE SECOND CELL WITH STATUS A2 (E.G., STRONGEST) DURING ANY TIME ASSOCIATED WITH A SECOND PTW (PTW2) DURATION OF THE CONFIGURED eDRX CYCLE, WHERE PTW2 OCCURS AFTER PTW1
202

↓

OBTAIN A FOURTH IDENTIFIER OF A SECOND TRANSMITTER (E.G., A SECOND TRANSMIT POINT) WITH STATUS B2 ASSOCIATED WITH THE AT LEAST ONE SECOND CELL DURING ANY TIME ASSOCIATED WITH THE SECOND PTW (PTW2) DURATION OF THE CONFIGURED eDRX CYCLE
202A

↓

PERFORM A FIRST TYPE OF NETWORK NODE RADIO OPERATIONS IF THE FIRST AND SECOND IDENTIFIERS ARE THE SAME
OR
PERFORM A SECOND TYPE OF NETWORK NODE RADIO OPERATIONS IF THE FIRST AND SECOND IDENTIFIERS ARE DIFFERENT
204

↓

PERFORM A THIRD TYPE OF NETWORK NODE RADIO OPERATIONS IF THE THIRD AND FOURTH IDENTIFIERS ARE THE SAME
OR
PERFORM A FOURTH TYPE OF NETWORK NODE RADIO OPERATIONS IF THE THIRD AND FOURTH IDENTIFIERS ARE DIFFERENT
204A

METHODS AND APPARATUS FOR CELL VERIFICATION UNDER UE EDRX

RELATED APPLICATIONS

This application is a 35 U.S.C. § 371 national phase filing of International Application No. PCT/162017/050517, filed Jan. 31, 2017, which claims the benefit of provisional patent application Ser. No. 62/289,522, filed Feb. 1, 2016, the disclosures of which are hereby incorporated herein by reference in their entireties.

TECHNICAL FIELD

Embodiments of the present disclosure relate to the field of wireless communication; and more specifically, to methods of cell verification under User Equipment device (UE) extended Discontinuous Reception (eDRX).

BACKGROUND

Power consumption is important for User Equipment devices (UEs) using battery or an external power supply and its importance increases with the continued growth of device populations and more demanding use cases. The importance can be illustrated by the following scenarios, e.g.:
  For Machine-to-Machine (M2M) use cases like sensors that run on battery, it is a major cost to on-site exchange (or charge) the batteries for a large amount of devices and the battery lifetime may even determine the device's lifetime if it is not foreseen to charge or replace the battery;
  Even for scenarios where UEs may consume power from an external power supply, it may be desirable to consume less power for energy efficiency purposes.

Enhancing Discontinuous Reception (DRX) operation, currently discussed in the Third Generation Partnership Project (3GPP), is a way to improve battery saving in the UE. DRX makes the UE reachable during pre-defined occasions without resulting in unnecessary signaling. As currently defined, DRX cycles in Long Term Evolution (LTE) can at most be 2.56 seconds and thus would not allow for sufficient power savings for UEs that only need to wake-up infrequently (e.g., every few or tens of minutes) for data. Hence, DRX cycle extension is required in order to enable significant battery savings for such UEs. Furthermore, the DRX cycle can be set depending on the data delay tolerance and power saving requirements, thus providing a flexible solution for achieving significant UE battery savings.

Currently, 3GPP is defining extended DRX (eDRX), which may also be referred to as enhanced DRX, operation for UEs in CONNECTED mode in LTE and for UEs in IDLE mode in LTE and Universal Terrestrial Radio Access (UTRA). In LTE, the eDRX in IDLE mode is based on the Hyper System Frame Number (H-SFN) concept.

1 DRX Configuration for Non-eDRX (legacy) UE

In LTE, DRX has been introduced as one of the key solutions to conserve battery power in the UE (e.g., mobile terminal). DRX is characterized by the following:
  DRX is a per UE mechanism, as opposed to a per radio bearer mechanism.
  DRX may be used in RRC_IDLE and RRC_CONNECTED; In RRC_CONNECTED, the evolved Node B (eNB)/UE may initiate the DRX mode when there are no outstanding/new packets to be transmitted/received. In RRC_IDLE:
  Second and Third Generation (2G and 3G) UEs (i.e., terminals) use DRX in idle state to increase battery lifetime. High Speed Packet Access (HSPA) and LTE have introduced DRX also for connected state.
  Available DRX values are controlled by the network and start from non-DRX up to x seconds.
  Hybrid Automatic Repeat Request (HARQ) operation related to data transmission is independent of DRX operation, and the UE wakes up to read the Physical Downlink Control Channel (PDCCH) for possible retransmissions and/or Acknowledgement/Negative Acknowledgment (ACK/NACK) signaling regardless of DRX. In the downlink, a timer is used to limit the time the UE stays awake awaiting for a retransmission.
  When DRX is configured, the UE may be further configured with an "on-duration" timer during which time the UE monitors the PDCCHs for possible allocations.
  When DRX is configured, periodic Channel Quality Indicator (CQI) reports can only be sent by the UE during the "active-time." Radio Resource Control (RRC) can further restrict periodic CQI reports so that they are only sent during the on-duration.
  The eNB does not transmit packets to the UE during the sleep mode.

1.1 for UE in RRC_IDLE

A UE is set to DRX in idle mode after a prolonged time of air interface inactivity. Idle mode DRX is also known as paging DRX, i.e. the time the UE can go to sleep between two paging messages which could contain a command for the UE to wake up again and change back to connected state.

FIG. 1 is a legacy procedure to determine the IDLE DRX cycle in LTE. The eNB broadcasts a default DRX value via System Information Block Type 1 (SIB1). The UE can provide a UE specific DRX value to a Mobility Management Entity (MME) if the UE wants to have a shorter DRX than the default value. Upon triggering a paging for the UE, the MME sends the UE a specific DRX value together with the paging to the eNB. Both the UE and the eNB know the default DRX value and the UE specific DRX value, and the final DRX cycle T is set to the shortest of them. If the UE does not provide the UE specific DRX value, the final DRX cycle T is the default DRX value.

One Paging Frame (PF) is one radio frame, which may contain one or multiple Paging Occasion(s) (PO(s)). When DRX is used, the UE needs only to monitor one PO per DRX cycle.

1.2 For UE in RRC_CONNECTED

The following definitions apply to DRX in Evolved Universal Terrestrial Radio Access Network (E-UTRAN):
  on-duration: The on-duration is a duration in downlink subframes that the UE waits for, after waking up from DRX, to receive PDCCHs. If the UE successfully decodes a PDCCH, the UE stays awake and starts the inactivity timer.
  inactivity-timer: The inactivity-timer is a duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e., not for retransmissions).

active-time: The active-time is a total duration that the UE is awake. This includes the "on-duration" of the DRX cycle, the time UE is performing continuous reception while the inactivity timer has not expired, and the time UE is performing continuous reception while waiting for a downlink retransmission after one HARQ Round Trip Time (RTT). Based on the above, the minimum active time is of length equal to on-duration, and the maximum is undefined (infinite).

Of the above parameters, the on-duration and inactivity-timer are of fixed lengths, while the active-time is of varying lengths based on scheduling decision and UE decoding success. Only on-duration and inactivity-timer duration are signaled to the UE by the eNB:

There is only one DRX configuration applied in the UE at any time;

The UE shall apply an on-duration on wake-up from DRX sleep.

DRX mode in LTE is illustrated in FIG. 2.

DRX is triggered by means of an inactivity time known as DRX. As can be seen from FIG. 2, the UE activity time may be extended if PDCCH is received during ON Duration time. However, it may also be shorten by a Medium Access Control (MAC) DRX command, upon reception of which the UE stops onDurationTimer and drx-InactivityTimer.

If PDCCH has not been successfully decoded during the on-duration, the UE shall follow the DRX configuration (i.e., the UE can enter DRX sleep if allowed by the DRX configuration):

This applies also for the subframes where the UE has been allocated predefined resources.

If the UE successfully decodes a PDCCH for a first transmission, the UE shall stay awake and start the inactivity timer, even if a PDCCH is successfully decoded in the subframes where the UE has also been allocated predefined resources, until a MAC control message tells the UE to re-enter DRX or until the inactivity timer expires. In both cases, the DRX cycle that the UE follows after re-entering DRX is given by the following rules:

If a short DRX cycle is configured, the UE first follows the short DRX cycle and, after a longer period of inactivity, the UE follows the long DRX cycle. If the short DRX cycle is used, the long cycle will be a multiple of the short cycle.

Durations for long and short DRX are configured by the RRC. The transition between the short and long DRX cycles is determined by the eNB MAC commands (if the command is received and short DRX is configured, the UE will (re)start drxShort-CycleTimer and use the Short DRX Cycle; otherwise, long DRX will be used) or by the UE based on an activity timer.

Else the UE follows the long DRX cycle directly.

Some parameters that may be configured by the network:

onDurationTimer can be (in PDCCH subframes): 1, 2, 3, 4, 5, 6, 8, 10, 20, 30, 40, 50, 60, 80, 100, and 200.

drx-InactivityTimer can be (in PDCCH subframes): 1, 2, 3, 4, 5, 6, 8, 10, 20, 30, 40, 50, 60, 80, 100, 200, 300, 500, 750, 1280, 1920, and 2560. A specific value may also be configured if the UE supports In-Device Co-Existence (IDC).

longDRX-CycleStartOffset (in subframes): depending on the cycle length, but up to 2559.

shortDRX-cycle (in subframes): 2, 5, 8, 10, 16, 20, 32, 40, 64, 80, 128, 160, 256, 320, 520, and 640.

2 eDRX Configuration in LTE 2.1 for UE in RRC_IDLE

Like for DRX, eDRX configuration parameters are "negotiated" between the UE and the network via the Non-Access Stratum (NAS). The UE may include eDRX parameters in ATTACH REQUEST or TRACKING AREA UPDATE REQUEST messages. The network shall include eDRX parameters (i.e., eDRX cycle length, paging window length, etc.) in ATTACH ACCEPT or TRACKING AREA UPDATE ACCEPT messages if the UE included eDRX parameters (e.g., eDRX cycle) in the corresponding REQUEST message and the network supports and accepts the use of eDRX. The eDRX parameters include eDRX cycle length and Paging Time Window (PTW) length.

The UE is configured with a PTW assigned by the MME and provided to the UE via NAS (see, e.g., 3GPP Technical Specification (TS) 24.301 V13.4.0). PTW is characterized by:

Paging H-SFN (PH), which is calculated by a defined formula:

H-SFN mod TeDRX=(UE_ID mod TeDRX)

UE_ID: International Mobile Subscriber Identity (IMSI)mod 1024

TeDRX: eDRX cycle of the UE, (TeDRX=1, 2, . . . , 256 in hyper-frames) and configured by upper layers PTW start, which is calculated within the PH:

The start of PTW is uniformly distributed across four paging starting points within the PH.

PW_start denotes the first radio frame of the PH that is part of the paging window and has a System Frame Number (SFN) satisfying the following equation:

$$SFN=256*ieDRX, \text{ where } ieDRX=\text{floor}(UE\_ID/TeDRX,H)\bmod 4$$

PW end is the last radio frame of the PTW and has a SFN satisfying the following equation:

$$SFN=(PW\_start+L*100-1)\bmod 1024, \text{ where}$$

L=Paging Window length (in seconds) configured by upper layers

PTW length (configured by higher layers).

Within a PTW, the UE is further configured with a legacy DRX, as illustrated in FIG. 2.

H-SFN is defined as a new frame structure on top of the legacy SFN structure, where each H-SFN value corresponds to a cycle of 1024 legacy frames and one H-SFN cycle contains 1024 H-SFNs (10 bits), as illustrated in FIG. 3. All MMEs and eNBs have the same H-SFN, and cells broadcast their H-SFN via SIB1 or SIB1bis. FIG. 4 illustrates the relation between H-SFN, paging window, and eDRX periodicity.

The PTW is assigned by MME and provided to the UE via NAS during attach/tracking area update. The beginning of PTW is calculated by a pre-defined formula.

2.2 For UE in RRC_CONNECTED

The eDRX procedure for RRC_CONNECTED UE is the same as the legacy case, except that two new DRX cycles have been added: 5.12, 10.28 seconds.

3. eDRX Configuration in UTRA

3.1 eDRX in UTRA

In UTRA, eDRX has been specified only for IDLE state. In eDRX for UTRA, the DRX cycle is prolonged to some number of seconds which is much longer than the legacy DRX cycles. The DRX cycle consists of a long sleep period, then the UE wakes up to a Paging Transmission Window where there are N_PTW paging occasions with the legacy Packet-Switched (PS) DRX cycle. This is shown in FIG. 5.

4 Cell Global Identifier (CGI)

The Physical Cell Identifier (PCI) is reused among cells since there is a limited number of PCIs. For example there are 504 PCIs in LTE. The PCI is therefore not unique and, due to reuse, the acquired PCI of a cell may lead to ambiguity in terms of identifying that cell. This is also known as "PCI confusion." On the other hand, the CGI of a cell is a unique identifier. No two or more cells can have the same CGI. Therefore, by acquiring the CGI of a cell, the UE can unambiguously and uniquely identify that cell. The PCI is encoded in physical signals of the cell. On the other hand, the CGI of a cell is transmitted by the cell in System Information (SI). The SI is typically sent on broadcast channel(s). Therefore, the acquisition of the CGI requires the UE to read the SI.

In LTE, in order to acquire CGI, the UE has to read both the Master Information Block (MIB) and SIB1. The CGI is typically acquired by the UE during autonomous gaps.

In LTE, the MIB contains the following set of information:
- Downlink bandwidth,
- Physical Hybrid Automatic Repeat Request Indicator Channel (PHICH) configuration, and
- SFN.

The MIB is transmitted periodically with a periodicity of 40 milliseconds (ms) and repetitions made within 40 ms. The first transmission of the MIB is scheduled in subframe #0 of radio frames for which the SFN mod 4=0, and repetitions are scheduled in subframe #0 of all other radio frames.

In LTE, the SIB1 contains the CGI along with additional information. The LTE SIB1, as well as other SIB messages, is transmitted on the Downlink Shared Channel (DL-SCH). The SIB1 is transmitted with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0.

In case of inter-Radio Access Technology (RAT) Universal Terrestrial Radio Access Network (UTRAN), the UE reads the MIB and System Information Block Type 3 (SIB3) of the target UTRAN cell to acquire its CGI.

The term CGI may interchangeably be called Evolved Universal Terrestrial Radio Access (E-UTRA) CGI (ECGI), UTRA CGI (U-CGI), Global Cell Identifier (ID) (GCI), SI, unique cell ID, etc.

5 Transmitter Identifier

A transmitter, e.g., a Transmit Point (TP) within a shared cell, may also be identified by an identifier which is unique within the shared cell.

6 Shared Cell

A shared cell is a type of downlink Coordinated Multi-Point (CoMP) where multiple geographically separated TPs dynamically coordinate their transmission towards the UE. The unique feature of shared cell is that all TPs within the shared cell have the same PCI. This means that the UE cannot distinguish between the TPs by the virtue of PCI decoding. The PCI is acquired during a measurement procedure, e.g. cell identification, etc.

In a typical deployment of a shared cell, a heterogeneous network includes low power Remote Radio Heads (RRHs) within the macro cell coverage, where the transmission/reception points created by the RRHs have the same PCI as that of the macro cell. In general, a shared cell comprises of a set of Low Power Nodes (LPNs) and a serving High Power Node (HPN). One example of a shared cell is shown in FIG. 6.

The shared cell approach can be implemented by distributing the same cell specific signals on all TPs within the macro cell coverage area. With such a strategy, the same physical signals such as Primary Synchronization Signals (PSSs), Secondary Synchronization Signals (SSSs), Cell Specific Reference Signals (CRSs), Positioning Reference Signals (PRSs), etc. and the same physical channels such as Physical Broadcast Channel (PBCH), Physical Downlink Shared Channel (PDSCH) containing paging and SIBs, control channels (PDCCH, Physical Control Format Indicator Channel (PCFICH), PHICH), etc. are transmitted from each TP in the downlink. Tight synchronization in terms of transmission timings between the TPs within a shared cell is used, e.g., in order of ±100 nanoseconds (ns) between any pair of TPs. This enables the physical signals and channels transmitted from MTPs to be combined over the air. The combining is similar to what is encountered in single-frequency networks for broadcast. Due to the single-frequency network effect, the average received signal strength on the UE side increases leading to improved coverage of the sync and control channels.

The maximum output power of a HPN can for example typically be between 43-49 decibel-milliwatts (dBm). One example of a HPN is a macro node, which is also known as a wide area base station. Examples of a LPN are a micro node which is also known as a medium area base station, a pico node which is also known as local area base station, a femto node which is also known as a Home Base Station (HBS), a relay node, etc. Typically, the maximum output power of a LPN is, for example, between 20-38 dBm depending upon the power class. For example, a pico node typically has a maximum output power of 24 dBm whereas HBS typically has a maximum output power of 20 dBm.

The size of a shared cell in terms of cell radius can vary from a few hundred meters (e.g., 100-500 meters (m)) to a few kilometers (e.g., 1-5 kilometers (km)).

The term shared cell is interchangeably used with other similar terms such as CoMP cluster with common cell ID, cluster cell with common cell ID, combined cell, RRH, Remote Radio Unit (RRU), Distributed Antenna System (DAS), heterogeneous network with shared cell ID, etc. Similarly, the term TP is also interchangeably used with other similar terms such as radio nodes, radio network nodes, base station, radio units, remote antenna, etc. All of them bear the same meaning. For consistency, the term shared cell, which is also more generic, is used herein. Furthermore the term TP for individual nodes within a shared cell is also used for consistency.

7 Problems Associated with Legacy Systems

In legacy systems, a network node can schedule a UE configured with eDRX in any PTW (i.e., during any eDRX ON duration). However, the eDRX cycle length can be very long (e.g., up to several minutes and even up to hours in the future). Between successive PTW durations, the UE may considerably change its location. Furthermore, between successive PTW durations, the signal quality of the serving cell may significantly change even if the serving cell remains the same across different PTW durations. Due to a change in the serving cell or a change in the signal quality of the old serving cell across different PTW durations, the UE serving cell performance can be very inconsistent and unpredictable. This may lead to loss of signals transmitted between the UE and the serving cell, e.g. loss of uplink and/or uplink scheduling grant, etc.

As such, there is a need for systems and methods for improving performance when a UE is configured with eDRX.

SUMMARY

Systems and methods for cell verification for a wireless device configured to operate under extended Discontinuous Reception (eDRX) are disclosed. Embodiments of a method of operation of a wireless communication device configured to operate with an eDRX cycle are disclosed. In some embodiments, the method comprises acquiring a first identifier of at least one first cell during a time associated with a first Paging Time Window (PTW) of the eDRX cycle with which the wireless communication device is configured. The method further comprises acquiring a second identifier of at least one second cell during a time associated with a second PTW of the eDRX cycle with which the wireless communication device is configured. The second PTW occurs subsequent to the first PTW. The method further comprises performing a first type of wireless communication device radio operations if the first identifier is the same as the second identifier and performing a second type of wireless communication device radio operations if the first identifier is different than the second identifier. In this manner, the wireless device is able to, e.g., determine whether its serving cell has changed between the first and second PTWs when, e.g., the wireless device is configured with a very long eDRX cycle and take appropriate action.

In some embodiments, the at least one first cell is at least one serving cell of the wireless communication device. In some embodiments, the at least one second cell is at least one strongest cell as measured by the wireless communication device.

In some embodiments, the time associated with the first PTW is one of a time during the first PTW, a time immediately before the first PTW, and a time immediately after the first PTW. In some embodiments, the time associated with the second PTW is one of a time during the first PTW and a time immediately before the first PTW.

In some embodiments, the first identifier of the at least one first cell is a first Cell Global Identifier (CGI) of the at least one first cell, and the second identifier of the at least one second cell is a second CGI of the at least one second cell.

In some embodiments, the at least one first cell is at least one serving cell of the wireless communication device, the at least one second cell is at least one strongest cell as measured by the wireless communication device, and the first type of wireless communication device radio operations are wireless communication device radio operations performed on the at least one second cell that are the same as those performed by the wireless communication device on the at least one serving cell when the wireless communication device was served by the at least one serving cell during the first PTW.

In some embodiments, the at least one first cell is at least one serving cell of the wireless communication device, the at least one second cell is at least one strongest cell as measured by the wireless communication device, and performing the first type of wireless communication device radio operations if the first identifier is the same as the second identifier comprises performing one or more radio measurements on signals of the at least one second cell.

In some embodiments, the at least one first cell is at least one serving cell of the wireless communication device, the at least one second cell is at least one strongest cell as measured by the wireless communication device, and performing the first type of wireless communication device radio operations if the first identifier is the same as the second identifier comprises performing one or more radio measurements on signals of one or more neighbor cells.

In some embodiments, the at least one first cell is at least one serving cell of the wireless communication device, the at least one second cell is at least one strongest cell as measured by the wireless communication device, and performing the first type of wireless communication device radio operations if the first identifier is the same as the second identifier comprises performing, on the at least one second cell, one or more tasks related to a serving cell of the wireless communication device.

In some embodiments, the at least one first cell is at least one serving cell of the wireless communication device, the at least one second cell is at least one strongest cell as measured by the wireless communication device, and performing the first type of wireless communication device radio operations if the first identifier is the same as the second identifier comprises performing at least one of a group consisting of: performing Radio Link Monitoring (RLM) on signals of the at least one second cell, receiving of one or more control channels of the at least one second cell, transmitting signals to and/or receiving signals from the at least one second cell based on scheduling information received from a network node, and sending an indication to a network node that informs the network node that the at least one first cell and the at least one second cell are the same.

In some embodiments, the at least one first cell is at least one serving cell of the wireless communication device, the at least one second cell is at least one strongest cell as measured by the wireless communication device, and performing the second type of wireless communication device radio operations if the first identifier is different than the second identifier comprises performing at least one of a group consisting of: refraining from performing RLM on signals of the at least one second cell, ignoring any scheduling grant received from the at least one second cell, refraining from transmitting any data in an uplink on the at least one second cell, entering idle mode if the wireless communication device is in a connected state, determining whether the wireless communication device needs to change a tracking area or registration area of the wireless communication device based on whether the at least one second cell belongs to a different tracking area or registration area as compared to that of the at least one first cell, performing a tracking area update if the at least one second cell does not belong to a previous tracking area of the wireless communication device, initiating a connection re-establishment to re-establish a connection to the at least one second cell as at least one new serving cell of the wireless communication device, sending an indication to a network node that informs the network node that the at least one first cell and the at least one second cell are different, and sending measurement results of measurements performed on the at least one second cell to a network node.

In some embodiments, the method further comprises acquiring a third identifier of a first transmitter associated with the at least one first cell during a time associated with the first PTW of the eDRX cycle with which the wireless communication device is configured and acquiring a fourth identifier of a second transmitter associated with the at least one second cell during a time associated with the second PTW of the eDRX cycle with which the wireless communication device is configured. The method further comprises performing a third type of wireless communication device radio operations if the third identifier is the same as the fourth identifier and performing a fourth type of wireless communication device radio operations of the third identifier is different than the fourth identifier. Further, in some embodiments, the at least one first cell is at least one first shared cell having a plurality of first Transmit Points (TPs), and the first transmitter is a TP from among the plurality of first TPs that satisfies a first predefined criteria. Further, in some embodiments, the at least one second cell is at least one second shared cell having a plurality of second TPs, and the second transmitter is a TP from among the plurality of second TPs that satisfies a second predefined criteria. In some embodiments, the first predefined criteria is being a strongest TP as measured by the wireless communication device from among the plurality of first TPs or not being weaker than a first predefined threshold, and the second predefined criteria is being a strongest TP as measured by the wireless communication device from among the plurality of second TPs or not being weaker than a second predefined threshold.

In some embodiments, performing the third type of wireless communication device radio operations if the third identifier is the same as the fourth identifier comprises performing at least one of a group consisting of: performing RLM on signals of the second transmitter, performing one or more radio measurements on signals of the second transmitter, performing one or more radio measurements on signals of one or more neighbor cells, receiving one or more control channels of the second transmitter, transmitting signals to and/or receiving signals from the second transmitter based on scheduling information received from a network node, sending an indication to a network node that informs the network node that the first transmitter and the second transmitter are the same, and performing, on the second transmitter, one or more tasks related to a serving cell of the wireless communication device.

In some embodiments, performing the fourth type of wireless communication device radio operations if the third identifier is different than the fourth identifier comprises performing at least one of a group consisting of:

refraining from performing RLM on signals of the second transmitter, ignoring any scheduling grant received from the second transmitter, refraining from transmitting any data in an uplink to the second transmitter, entering idle mode if the wireless communication device is in a connected state, determining whether the wireless communication device needs to change a tracking area or registration area of the wireless communication device based on whether the second transmitter belongs to a different tracking area or registration area as compared to that of the first transmitter, performing a tracking area update if the second transmitter does not belong to a previous tracking area of the wireless communication device, initiating a connection re-establishment to re-establish a connection to the second transmitter as a serving TP of the wireless communication device, sending an indication to a network node that informs the network node that the first transmitter and the second transmitter are different, and sending measurement results of measurements performed on the second transmitter to a network node.

Embodiments of a wireless communication device are also disclosed. In some embodiments, a wireless communication device configured to operate with an eDRX cycle is adapted to acquire a first identifier of at least one first cell during a time associated with a first PTW of the eDRX cycle with which the wireless communication device is configured and acquire a second identifier of at least one second cell during a time associated with a second PTW of the eDRX cycle with which the wireless communication device is configured. The second PTW occurs subsequent to the first PTW. The wireless communication device is further adapted to perform a first type of wireless communication device radio operations if the first identifier is the same as the second identifier and perform a second type of wireless communication device radio operations if the first identifier is different than the second identifier.

In some embodiments, the wireless communication device is further adapted to operate according to any one of the embodiments of the method of operation of a wireless communication device disclosed herein.

In some embodiments, a wireless communication device configured to operate with an eDRX cycle comprises a transceiver, one or more processors, and memory comprising instructions executable by the one or more processors whereby the wireless communication device is operable to acquire a first identifier of at least one first cell during a time associated with a first PTW of the eDRX cycle with which the wireless communication device is configured, acquire a second identifier of at least one second cell during a time associated with a second PTW of the eDRX cycle with which the wireless communication device is configured where the second PTW occurs subsequent to the first PTW, perform a first type of wireless communication device radio operations if the first identifier is the same as the second identifier, and perform a second type of wireless communication device radio operations if the first identifier is different than the second identifier.

Embodiments of a computer program are also disclosed. In some embodiments, a computer program comprises instructions which, when executed on at least one processor, cause the at least one processor to carry out the method of operation of a wireless communication device according to any one of the embodiments disclosed herein. In some embodiments, a carrier containing the aforementioned computer program is also disclosed, wherein the carrier is one of an electronic signal, an optical signal, a radio signal, or a computer readable storage medium.

Embodiments of a method of operation of a network node are also disclosed. In some embodiments, a method of operation of a network node for a cellular communications network comprises obtaining a first identifier of at least one first cell of a wireless communication device during a time associated with a first PTW of an eDRX cycle with which the wireless communication device is configured and obtaining a second identifier of at least one second cell of the wireless communication device during a time associated with a second PTW of the eDRX cycle with which the wireless communication device is configured. The second PTW occurs subsequent to the first PTW. The method further comprises performing a first type of network node radio operations if the first identifier is the same as the second identifier and performing a second type of network node radio operations if the first identifier is different than the second identifier.

In some embodiments, the at least one first cell is at least one serving cell of the wireless communication device. In some embodiments, the at least one second cell is at least one strongest cell as measured by the wireless communication device.

In some embodiments, the time associated with the first PTW is one of a time during the first PTW, a time immediately before the first PTW, and a time immediately after the first PTW. In some embodiments, the time associated with the second PTW is one of a time during the first PTW and a time immediately before the first PTW.

In some embodiments, the first identifier of the at least one first cell is a first CGI of the at least one first cell, and the second identifier of the at least one second cell is a second CGI of the at least one second cell.

In some embodiments, the at least one first cell is at least one serving cell of the wireless communication device, the at least one second cell is at least one strongest cell as measured by the wireless communication device, and the first type of network node radio operations are network node radio operations performed by the network node with respect to the at least one strongest cell that are the same as those performed by the network node with respect to at least one serving cell when the wireless communication device was served by the at least one serving cell during the first PTW.

In some embodiments, the at least one first cell is at least one serving cell of the wireless communication device, the at least one second cell is at least one strongest cell as measured by the wireless communication device, and performing the first type of network node radio operations if the first identifier is the same as the second identifier comprises performing at least one of a group consisting of: configuring the wireless communication device with one or more parameters for enabling the wireless communication device to perform RLM on signals of the at least one second cell, scheduling the wireless communication device in an uplink and/or downlink on the at least one second cell without delay to make the at least one second cell a new serving cell of the wireless communication device, receiving an indication from the wireless communication device that informs the network node that the wireless communication device has identified the at least one first cell and the at least one second cell as being the same, and receiving one or more measurement results from the wireless communication device and using the one or more measurements for one or more operations for scheduling in the at least one second cell.

In some embodiments, the at least one first cell is at least one serving cell of the wireless communication device, the at least one second cell is at least one strongest cell as measured by the wireless communication device, and performing the second type of network node radio operations if the first identifier is different than the second identifier comprises performing at least one of a group consisting of: refraining from scheduling the wireless communication device for uplink and/or downlink data transmission in the at least one second cell, scheduling the wireless communication device for uplink and/or downlink data transmission in the at least one second cell only after a delay to make the at least one second cell a new serving cell of the wireless communication device, preparing reception of a random access message or a message from the wireless communication device for establishing a connection to the at least one second cell, ignoring any data transmitted by the wireless communication device unless the wireless communication device has established a connection with the at least one second cell, and preparing reception of a message from the wireless communication device that informs the network node that the at least one first cell and the at least one second cell are not the same.

In some embodiments, the method further comprises determining a third identifier of a first transmitter associated with the at least one first cell during a time associated with the first PTW of the eDRX cycle with which the wireless communication device is configured and determining a fourth identifier of a second transmitter associated with the at least one second cell during a time associated with the second PTW of the eDRX cycle with which the wireless communication device is configured. The method further comprises performing a third type of network node radio operations if the third identifier is the same as the fourth identifier and performing a fourth type of network node radio operations if the third identifier is different than the fourth identifier. In some embodiments, the at least one first cell is at least one first shared cell having a plurality of first TPs, and the first transmitter is a TP from among the plurality of first TPs that satisfies a first predefined criteria. In some embodiments, the at least one second cell is at least one second shared cell having a plurality of second TPs, and the second transmitter is a TP from among the plurality of second TPs that satisfies a second predefined criteria. In some embodiments, the first predefined criteria is being a strongest TP as measured by the wireless communication device from among the plurality of first TPs or not being weaker than a first predefined threshold, and the second predefined criteria is being a strongest TP as measured by the wireless communication device from among the plurality of second TPs or not being weaker than a second predefined threshold.

In some embodiments, performing the third type of network node radio operations if the third identifier is the same as the fourth identifier comprises performing at least one of a group consisting of: configuring the wireless communication device with one or more parameters for enabling the wireless communication device to perform RLM on signals of the second transmitter, scheduling the wireless communication device in an uplink and/or downlink on the at least one second cell without delay to make the at least one second cell a new serving cell of the wireless communication device, receiving an indication from the wireless communication device that informs the network node that the wireless communication device has identified the at least one first cell and the at least one second cell as being the same, and receiving one or more measurement results from the wireless communication device and using the one or more measurements for one or more operations for scheduling in the at least one second cell.

In some embodiments, performing the fourth type of network node radio operations if the third identifier is different than the fourth identifier comprises performing at least one of a group consisting of: refraining from scheduling the wireless communication device for uplink and/or downlink data transmission in the at least one second cell, scheduling the wireless communication device for uplink and/or downlink data transmission in the at least one second cell only after a delay to make the at least one second cell a new serving cell of the wireless communication device, preparing reception of a random access message or a message from the wireless communication device for establishing a connection to the at least one second cell, ignoring any data transmitted by the wireless communication device unless the wireless communication device has established a connection with the at least one second cell, and preparing reception of a message from the wireless communication device that informs the network node that the at least one first cell and the at least one second cell are not the same.

Embodiments of a network node are also disclosed. In some embodiments, a network node for a cellular communications network is adapted to obtain a first identifier of at least one first cell of a wireless communication device during a time associated with a first PTW of an eDRX cycle with which the wireless communication device is configured and obtain a second identifier of at least one second cell of the wireless communication device during a time associated with a second PTW of the eDRX cycle with which the wireless communication device is configured. The second PTW occurs subsequent to the first PTW. The network node is further adapted to perform a first type of network node radio operations if the first identifier is the same as the second identifier and perform a second type of network node radio operations if the first identifier is different than the second identifier.

In some embodiments, the network node is further adapted to operate according to any one of the embodiments of the method of operation of a network node disclosed herein.

In some embodiments, a network node for a cellular communications network comprises one or more processors and memory comprising instructions executable by the one or more processors whereby the network node is operable to obtain a first identifier of at least one first cell of a wireless communication device during a time associated with a first PTW of an eDRX cycle with which the wireless communication device is configured, obtain a second identifier of at least one second cell of the wireless communication device during a time associated with a second PTW of the eDRX cycle with which the wireless communication device is configured where the second PTW occurs subsequent to the first PTW, perform a first type of network node radio operations if the first identifier is the same as the second identifier, and perform a second type of network node radio operations if the first identifier is different than the second identifier.

Embodiments of a computer program are also disclosed. In some embodiments, a computer program comprises instructions which, when executed on at least one processor, cause the at least one processor to carry out the method of operation of a network node according to any one of the embodiments disclosed herein. In some embodiments, a carrier containing the aforementioned computer program is also disclosed, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 10 is a flow chart that illustrates methods in a wireless communication device (e.g., a User Equipment device (UE)) for serving cell verification under eDRX operation according to some embodiments of the present disclosure; and FIG. 11 is a flow chart that illustrates methods in a network node (e.g., in a radio access node) for verification of a serving cell of a wireless device (e.g., a UE) under eDRX operation according to some embodiments of the present disclosure.

DETAILED DESCRIPTION

Figure 1:
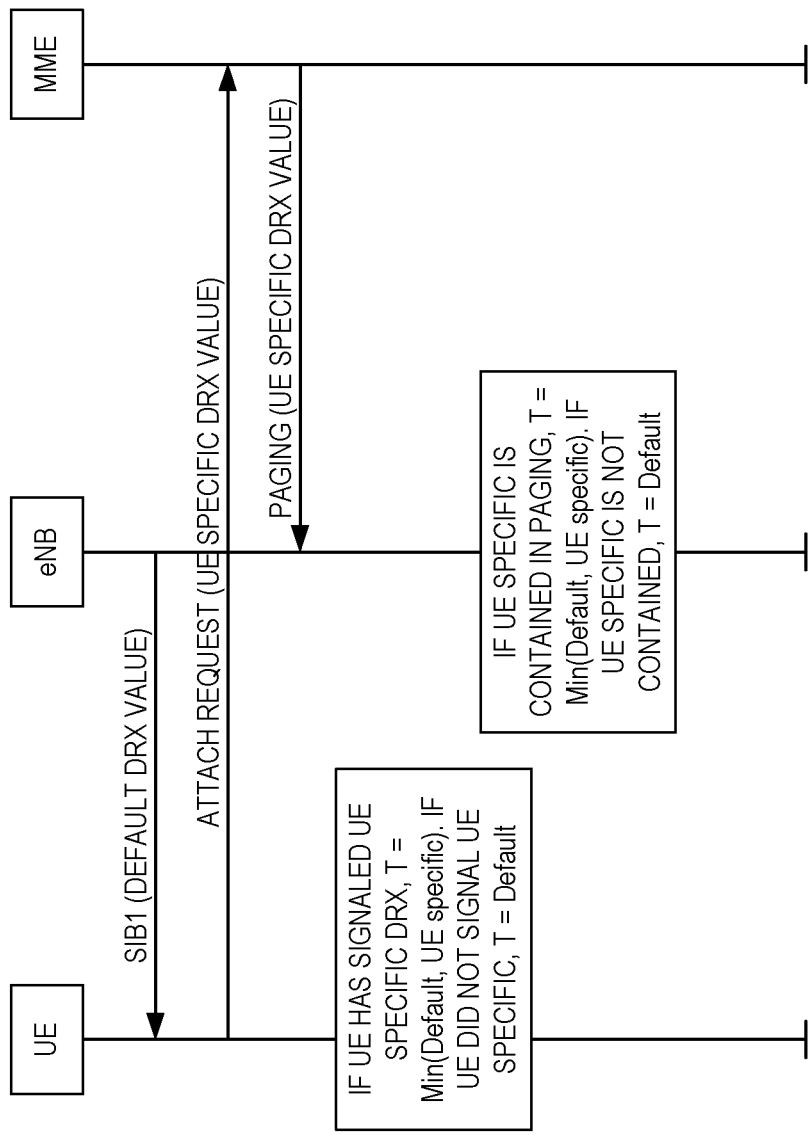
FIG. 1 illustrates a legacy procedure to determine the IDLE Discontinuous Reception (DRX) cycle in Long Term Evolution (LTE)
Figure 2:
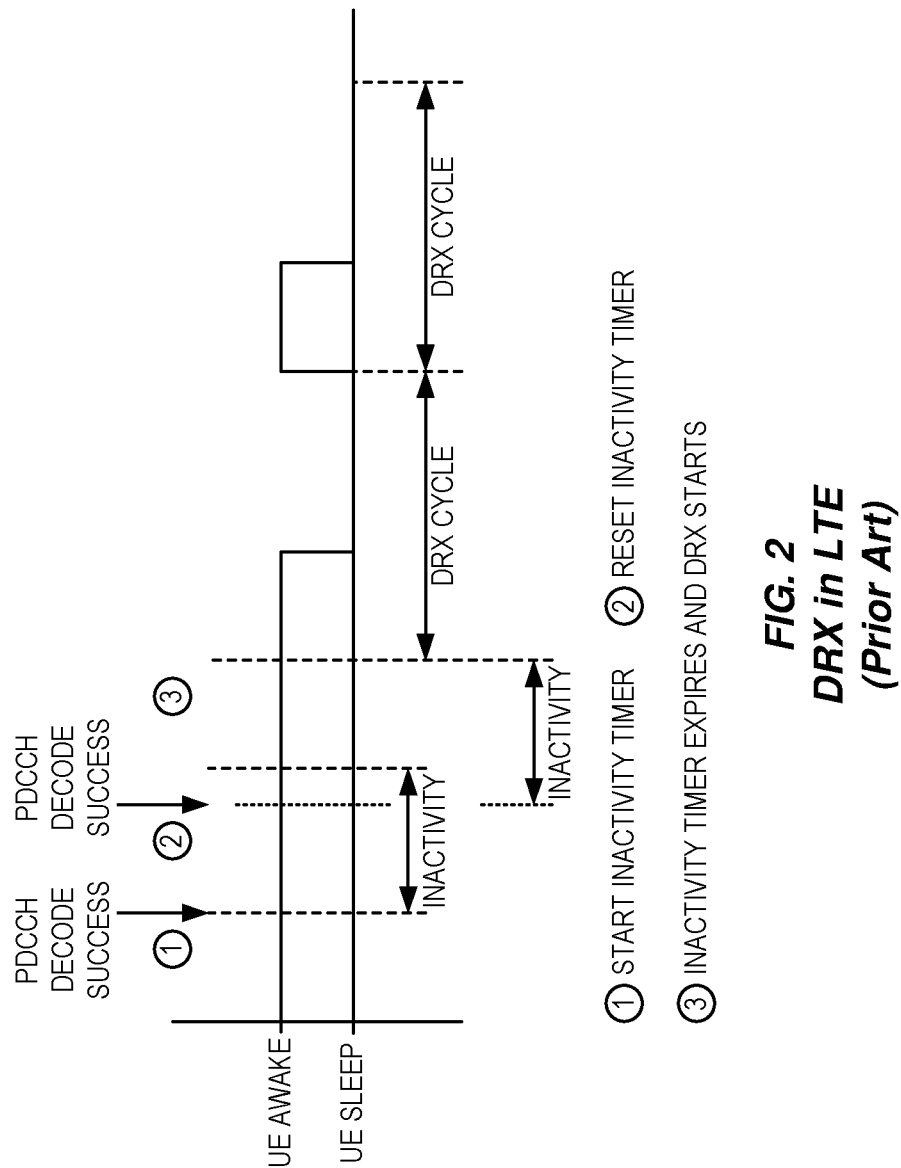
FIG. 2 illustrates DRX mode in LTE.
Figure 3:
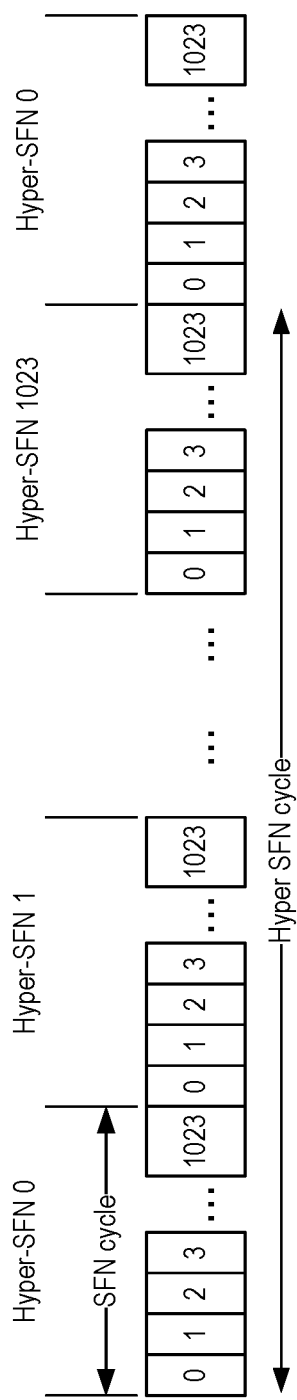
FIG. 3 illustrates the Hyper System Frame Number (H-SFN) structure in LTE.
Figure 4:
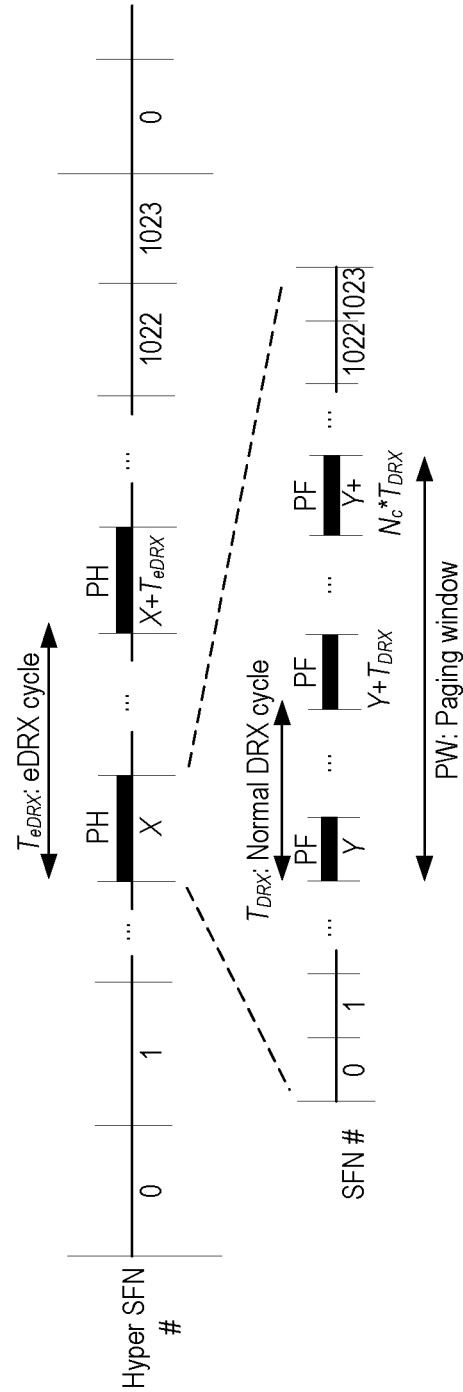
FIG. 4 illustrates the relation between H-SFN, paging window, and extended DRX (eDRX) periodicity.
Figure 5:
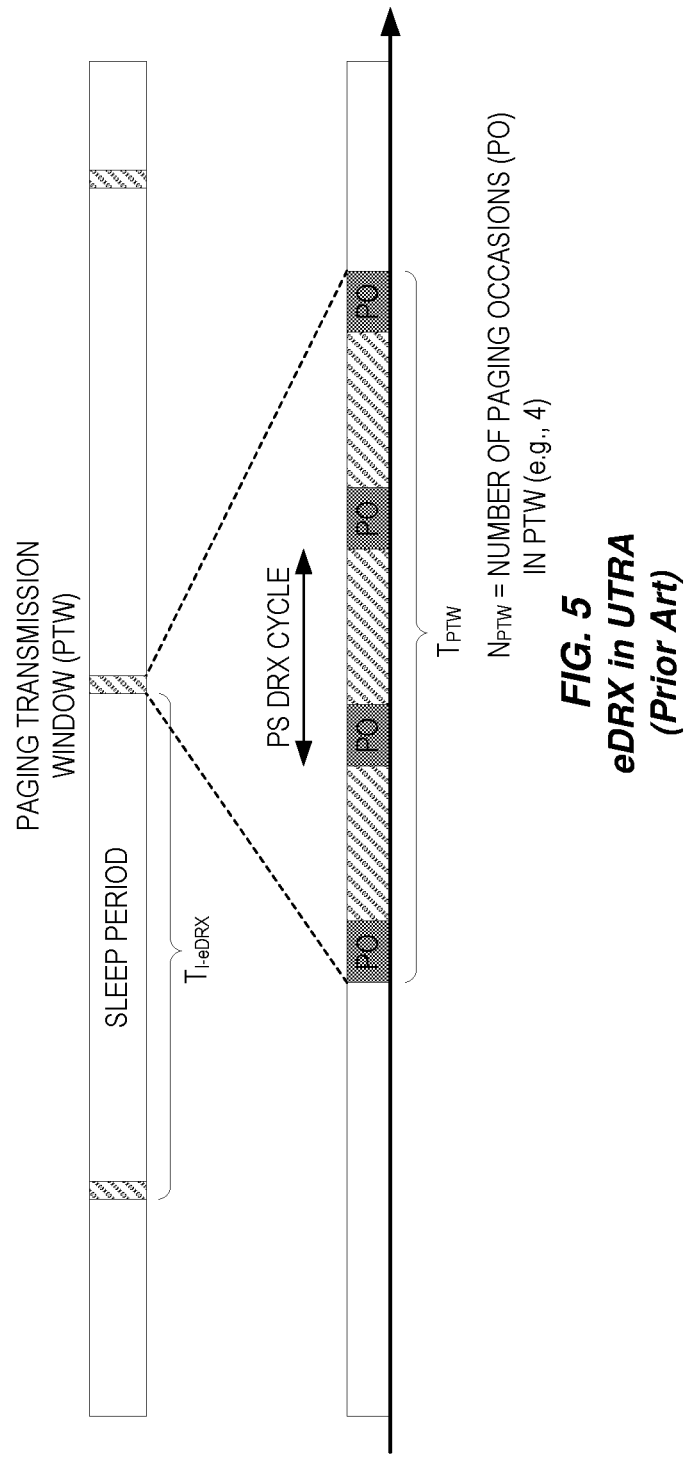
FIG. 5 illustrates eDRX in Universal Terrestrial Radio Access (UTRA)
Figure 6:
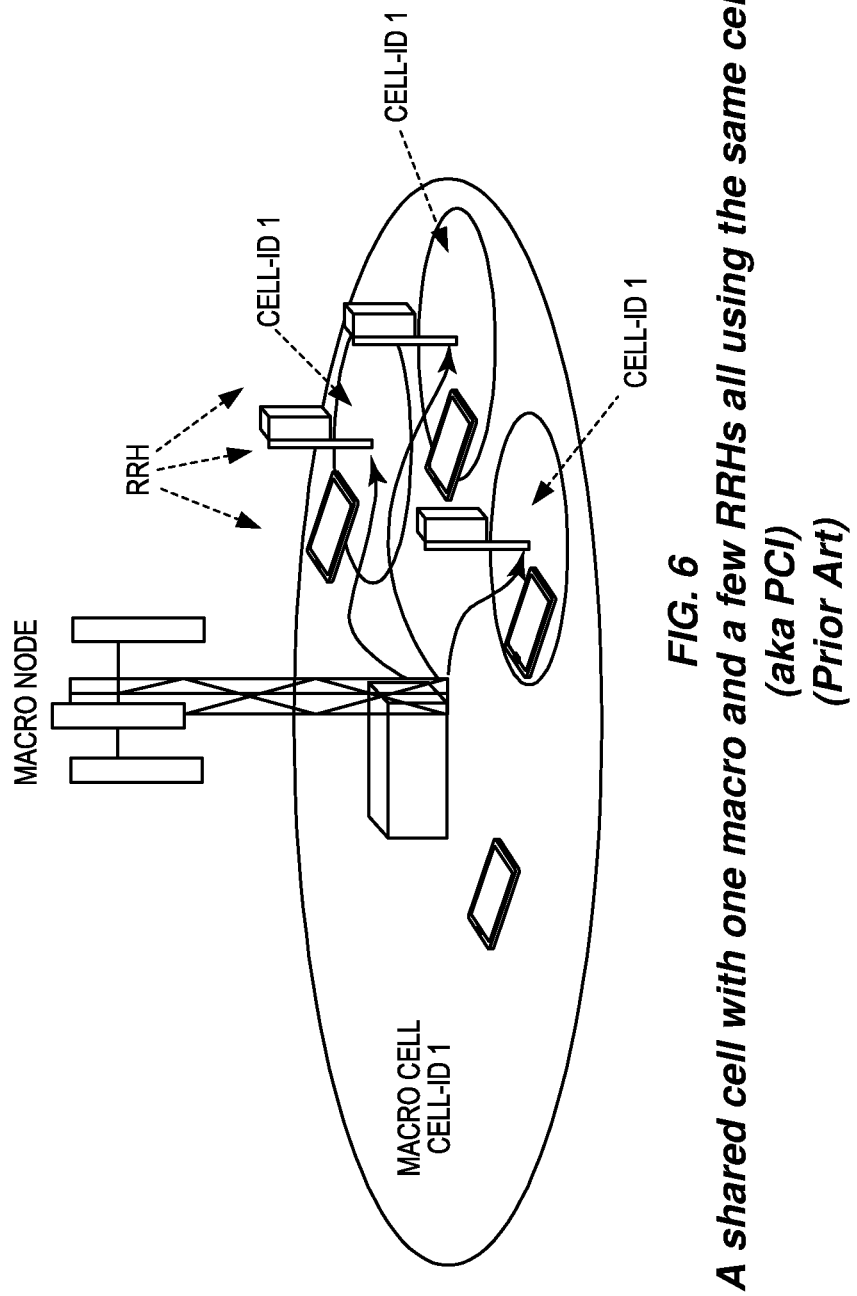
FIG. 6 illustrates one example of a shared cell.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, numerous specific details are set forth. However, it is understood that embodiments of the present disclosure may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical, or other form of propagated signals—such as carrier waves, infrared signals). In addition, such electronic devices include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the present disclosure may be implemented using different combinations of software, firmware, and/or hardware.

As used herein, a network node is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service (QoS), and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, User Equipment devices (UEs), terminals, portable media players, Global Positioning System (GPS) units, gaming systems, set-top boxes) access content/services provided over the Internet and/or content/services provided on Virtual Private Networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station, or other network apparatus can perform various functions described herein.

According to embodiments disclosed herein, a UE when configured with an extended Discontinuous Reception (eDRX) cycle (e.g., several minutes or hours), during the start of a Paging Time Window (PTW), first uniquely verifies one or both of a serving cell and a neighbor cell for which it is about to perform one or more operations. In one example, the verification may involve acquiring a Cell Global Identifier (ID) (CGI) of the cell and verifying whether the cell has the same status as during a previous PTW. The UE performs one or more operations based on the outcome of this comparison. The UE may further verify a transmitter associated with the verified cell, e.g., a Transmit Point (TP) in a shared cell. A similar procedure is also applied in a network node serving the UE, e.g. based on an indication received from the UE.

Embodiments can be implemented in a UE and/or a network node.

Figure 7:
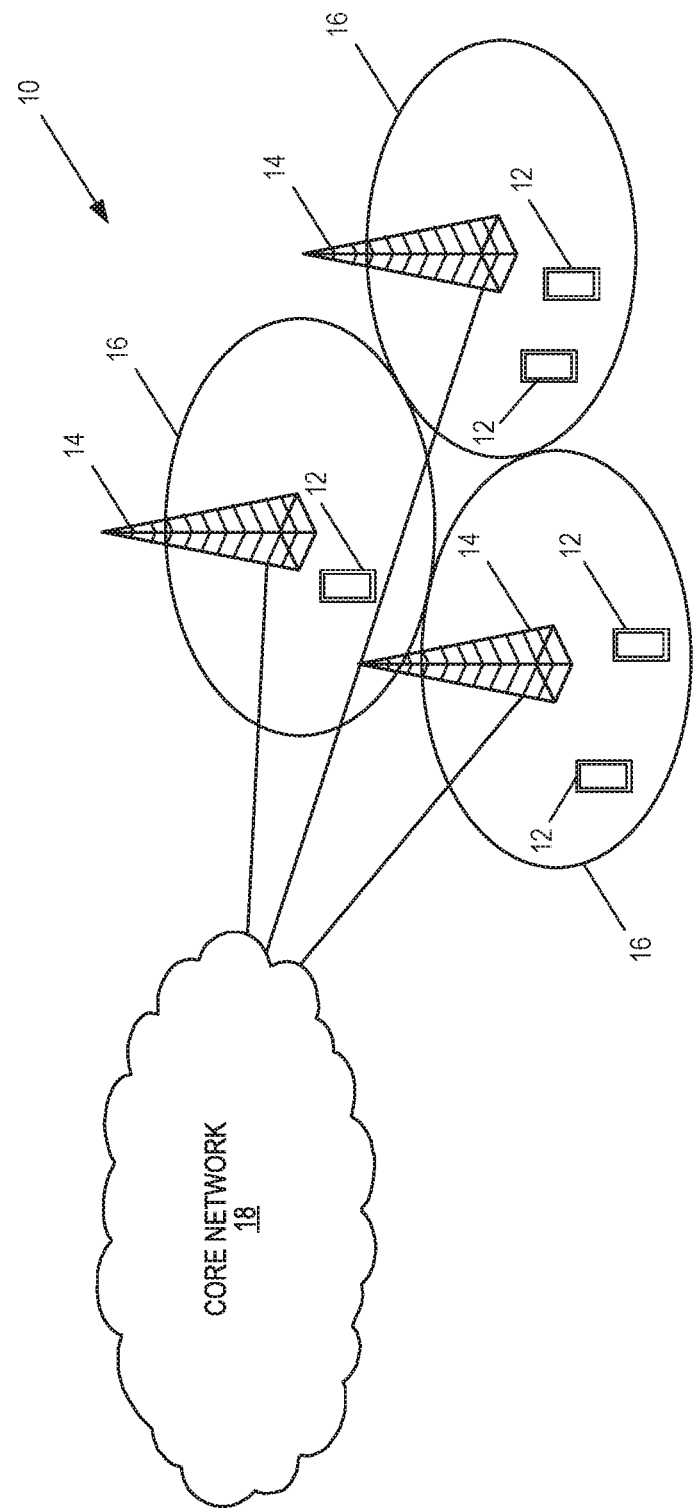
FIG. 7 illustrates one example of a cellular communications network in which embodiments of the present disclosure may be implemented.

Although the described solutions may be implemented in any appropriate type of telecommunication system supporting any suitable communication standards and using any suitable components, particular embodiments of the described solutions may be implemented in a Long Term Evolution (LTE) network 10, such as that illustrated in FIG. 7. As shown in FIG. 7, the example network 10 may include one or more instances of wireless communication devices 12 (e.g., conventional UEs, Machine Type Communication (MTC)/Machine-to-Machine (M2M) UEs, or the like) and one or more radio access nodes 14 (e.g., evolved Node Bs (eNBs) or other base stations) capable of communicating with these wireless communication devices 12 along with any additional elements suitable to support communication between wireless communication devices 12 or between a wireless communication device 12 and another communication device (such as a landline telephone). The radio access nodes 14 provide corresponding cells 16. The radio access nodes 14 are connected to a core network 18, which includes a number of core network nodes (e.g., Mobility Management Entities (MMEs), Serving Gateways (S-GWs), Packet Data Network Gateways (P-GWs), etc.).

Figure 8:
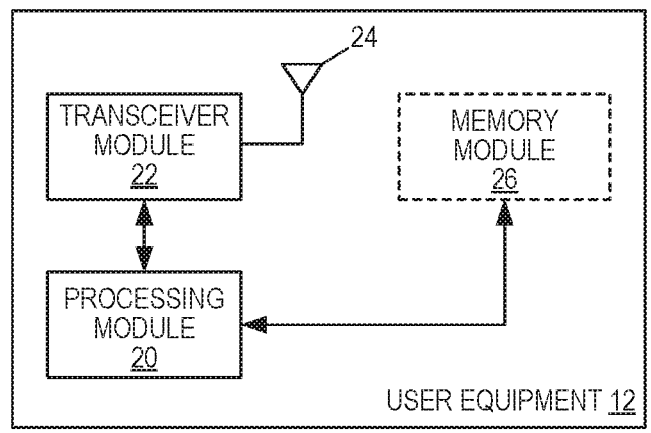
FIG. 8 illustrates one example of a wireless communication device.
Figure 9:
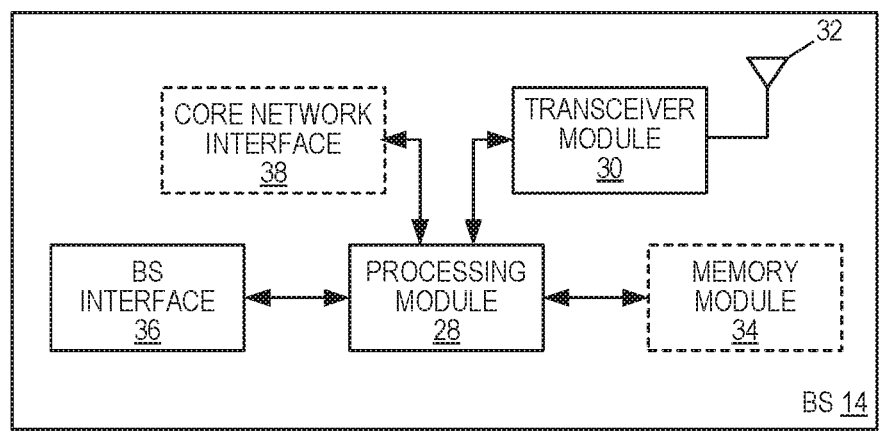
FIG. 9 illustrates one example of a radio access node.

Although the illustrated wireless communication devices 12 may represent communication devices that include any suitable combination of hardware and/or software, these wireless communication devices 12 may, in particular embodiments, represent devices such as the example wireless communication device 12 illustrated in greater detail by FIG. 8. In the example of FIG. 8, the wireless communication device 12 is a UE and, as such, is referred to as UE 12. Note, however, that the description herein of the UE 12 is more generally applicable to any type of wireless communication device 12. Similarly, although the illustrated radio access node 14 may represent network nodes that include any suitable combination of hardware and/or software, these nodes may, in particular embodiments, represent devices such as the example radio access node 14 illustrated in greater detail by FIG. 9. In the example of FIG. 9, the radio access node 14 is a base station and, as such, is referred to as a base station 14. Note, however, that the description herein of the base station 14 is more generally applicable to any type of radio access node 14.

FIG. 8 is a block diagram of a UE 12 (e.g., a mobile device) according to one exemplary embodiment that can be used in one or more of the non-limiting example embodiments described. The UE 12 comprises a processing module 20 that controls the operation of the UE 12. As will be understood by one of skill in the art, the processing module 20 includes one or more processors or processing circuitry (e.g., Central Processing Unit(s) (CPU(s)), Application Specification Integrated Circuit(s) (ASIC(s)), Digital Signal Processor(s) (DSP(s)), Field Programmable Gate Array(s) (FPGA(s)), and/or the like). The processing module 20 is connected to a receiver or transceiver module 22 with associated antenna(s) 24 which are used to receive signals from or both transmit signals to and receive signals from a radio access node 14 in the network 10. As will be appreciated by one of skill in the art, the transceiver module 22 includes various analog and potentially digital circuits (e.g., amplifiers, filters, mixers, Analog-to-Digital (A/D) converters, etc.). To make use of Discontinuous Reception (DRX), the processing module 20 can be configured to deactivate the receiver or transceiver module 22 for specified lengths of time. The UE 12 also comprises a memory module 26 that is connected to the processing module 20 and that stores program and other information and data required for the operation of the UE 12. For example, the memory module 26 may include memory (e.g., Random Access Memory (RAM)). In some embodiments, the UE 12 may optionally comprise a satellite positioning system (e.g., GPS) receiver module that can be used to determine the position and speed of movement of the UE 12.

FIG. 9 shows a base station 14 (e.g., a Node B or an eNB) that can be used in example embodiments described herein. It will be appreciated that although a macro eNB or more generally a High Power Node (HPN) will not in practice be identical in size and structure to a micro eNB or more generally a Low Power Node (LPN), for the purposes of illustration, the base stations 14 are assumed to include similar components. Thus, the base station 14 comprises a processing module 28 that controls the operation of the base station 14. As will be understood by one of skill in the art, the processing module 28 includes one or more processors or processing circuitry (e.g., CPU(s), ASIC(s), DSP(s), FPGA(s), and/or the like). The processing module 28 is connected to a transceiver module 30 with associated antenna(s) 32 which are used to transmit signals to, and receive signals from, UEs 12 in the network 10. As will be appreciated by one of skill in the art, the transceiver module 30 includes various analog and potentially digital circuits (e.g., amplifiers, filters, mixers, A/D converters, etc.). The base station 14 also comprises a memory module 34 that is connected to the processing module 28 and that stores program and other information and data required for the operation of the base station 14. For example, the memory module 34 may include memory (e.g., RAM). The base station 14 also includes components and/or circuitry 36 for allowing the base station 14 to exchange information with other base stations 14 (e.g., via an X2 interface) and components and/or circuitry 38 for allowing the base station 14 to exchange information with nodes in the core network 18 (e.g., via the S1 interface). It will be appreciated that base stations for use in other types of networks (e.g., Universal Terrestrial Radio Access Technology (UTRAN) or Wideband Code Division Multiple Access (WCDMA) Radio Access Network (RAN)) will include similar components to those shown in FIG. 9 and appropriate interface circuitry 36, 38 for enabling communications with the other network nodes in those types of networks (e.g., other base stations, mobility management nodes, and/or nodes in the core network 18).

The term "radio node" used herein may be used to denote a UE or a radio network node. A radio network node is interchangeably referred to herein as a radio access node.

Any two or more embodiments described in this document may be combined in any way with each other.

The embodiments are applicable to single carrier as well as to multicarrier or Carrier Aggregation (CA) operation of the UE 12 in which the UE 12 is able to receive and/or transmit data to more than one serving cells. The term CA is also called (e.g., interchangeably called) "multi-carrier system," "multi-cell operation," "multi-carrier operation," "multi-carrier" transmission and/or reception. In CA one of the Component Carriers (CCs) is the Primary CC (PCC) or simply primary carrier or even anchor carrier. The remaining ones are called Secondary CCs (SCCs) or simply secondary carriers or even supplementary carriers. The serving cell is interchangeably called a Primary Cell (PCell) or Primary Serving Cell (PSC). Similarly the secondary serving cell is interchangeably called a Secondary Cell (SCell) or Secondary Serving Cell (SSC).

The term "signaling" used herein may comprise any of: high-layer signaling (e.g., via Radio Resource Control (RRC)), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "eDRX cycle" used herein may interchangeably be called a first DRX cycle (DRX1). The term "legacy DRX cycle" used herein may interchangeably be called a second DRX cycle (DRX2). The PTW or PTW duration or period, during which the UE 12 can receive paging or read system information, occurs once every DRX1. The PTW may also be interchangeably called a first Paging Occasion or a PO of the DRX1. Within each PTW, the UE 12 is configured with at least one DRX2. The lengths of DRX1 and DRX2 are related by the following relation: DRX1>DRX2.

The term "measurement" herein refers to radio measurements. Some examples of the radio measurements are: signal strength or signal power measurements (e.g., Reference Signal Received Power (RSRP) or RSRP using Channel State Information (CSI) reference symbols (CSI-RSRP)), signal quality measurements (e.g., Reference Symbol Received Quality (RSRQ), Signal to Interference plus Noise Ratio (SINR), Reference Signal SINR (RS-SINR)), timing measurements (e.g., Reception-Transmission (Rx-Tx), Reference Signal Time Difference (RSTD), Round Trip Time (RTT), Time of Arrival (TOA)), Radio Link Monitoring (RLM) measurements, cell detection, cell identification, cell (re)selection, CSI, Precoding Matrix Indicator (PMI), and Channel Quality Indicator (CQI) measurements, system information reading, etc. The measurements may be absolute or relative (e.g., absolute RSRP and relative RSRP). The measurements may be performed for one or more different purpose, e.g., Radio Resource Management (RRM), Self-Organizing Network (SON), positioning, Minimization of Drive Tests (MDT), etc. The measurements may be, e.g., intra-frequency measurements, inter-frequency measurements, inter Radio Access Technology (RAT) measurements, or CA measurements. The measurements may be performed in the licensed and/or unlicensed spectrum.

The term RLM herein refers to a UE procedure or operation for monitoring the radio link quality of the connected serving cell. Based on RLM, the UE determines whether UE is in-sync or out-of-sync with respect to that serving cell. RLM is carried out by the UE 12 performing measurement on downlink reference symbols (Cell Specific Reference Signals (CRSs)) in RRC_CONNECTED state. If results of RLM indicate number of consecutive out-of-sync indications then the network may declare Radio Link Failure (RLF) till the monitoring indicates several consecutive in-sync indications. The actual RLM procedure is carried out by comparing the estimated downlink reference symbol measurements to some target Block Error Rate (BLER) expressed in terms of Qout and Qin. Qout and Qin correspond to a BLER of hypothetical M-PDCCH or PDCCH/PCIFCH transmissions from the serving cell.

In some embodiments the term UE mobility or cell change is used. This may comprise one or more of:
- Changing a cell (changing a cell to camp on or changing a serving cell, where the serving cell may also be primary, secondary, etc.)
- Changing a carrier frequency (changing a carrier frequency to camp on or changing a serving carrier frequency, where the serving carrier frequency may also be primary, secondary, etc.)
- Changing a frequency band
- Changing RAT (changing a RAT to camp on or changing a serving RAT, where the serving RAT may also be primary, secondary, etc.)
- Performing handover in UE CONNECTED state
- Performing cell selection/reselection in UE IDLE state The embodiments described herein may apply to any RAT or their evolution, e.g., LTE Frequency Division Duplexing (FDD), LTE Time Division Duplexing (TDD), Narrowband Internet of Things (NB-IoT), Universal Terrestrial Radio Access (UTRA), Global System for Mobile Communications (GSM), WiFi, short-range communication RAT, narrowband RAT, RAT for Fifth Generation (5G), etc.

FIG. 10 is a flow chart that illustrates methods in a UE 12 for serving cell verification under eDRX operation according to some embodiments of the present disclosure. In other words, FIG. 10 illustrates methods in a UE 12 configured to operate with an eDRX cycle according to some embodiments of the present disclosure. As illustrated, the methods in the UE 12 comprise the steps of:
- Step 100: The UE 12 acquires a first identifier (e.g., CGI1) of at least one first cell (cell1) with status A1 during any time associated with a first PTW (PTW1) duration of the configured eDRX cycle. Here, the first PTW duration is a duration of the first PTW (PTW1). Thus, the time associated with the first PTW (PTW1) duration is also referred to herein as a time associated with the first PTW (PTW1).
  - Step 100A (optional): The UE 12 acquires a third identifier of a first transmitter with status B1 associated with cell1 during any time associated with PTW1 of the configured eDRX cycle.
- Step 102: The UE 12 acquires a second identifier (e.g., CGI2) of at least one second cell (cell2) with status A2 during any time associated with a second PTW (PTW2) duration of the configured eDRX cycle, wherein PTW2 occurs after PTW1 in time.
  - Step 102A (optional): The UE 12 acquires a fourth identifier of a second transmitter with status B2 associated with cell2 during any time associated with PTW2 of the configured eDRX cycle.
- Step 104: The UE 12 performs one of the following:
  - a first type of UE radio operations if the first and the second identifiers are the same; and
  - a second type of UE radio operations if the first and the second identifiers are different.
- Step 104A (optional): If the first and the second identifiers are the same, the UE 12 performs one of the following:
  - a third type of UE radio operations if the third and the fourth identifiers are the same; and
  - a fourth type of UE radio operations if the third and the fourth identifiers are different.

The status of a cell or transmitter may be, e.g., any of: the cell is a PCell, the cell is a serving cell but note that multiple serving cells may exist in dual connectivity or CA, the cell is the Nth strongest cell (i.e., the Nth strongest cell as measured at the UE 12), the transmitter is the Mth strongest transmitter within a cell (i.e., the transmitter is the Mth strongest transmitter within a cell as measured at the UE 12), the transmitter is the Kth strongest transmitter at the UE 12 (i.e., the transmitter is the Kth strongest transmitter as measured at the UE 12), the signal strength and/or quality is above a threshold, the cell is a Lth best neighbor cell, the cell is the strongest neighbor, the cell is the Rth strongest interferer on a specific set of resources (e.g., having colliding reference signals with the serving cell), the cell belongs to a certain group associated with the identifier, the cell's identifier meets a certain condition associated with the identifier (e.g., mod(identifier,3)=0), etc.

The above steps performed by the UE 12 are elaborated in the following sections.

Step 100: Acquiring Identifier of Cell1 During Time Associated with PTW1

In one example, cell1 is a serving cell and the identifier is CGI, for which more details are provided below. However, the present disclosure is not limited to cell1 being a serving cell and the identifier being CGI.

In step 100, the UE 12 first determines that it is configured to operate with an eDRX cycle based on the eDRX configuration information received from the network node. In the next occurrence of a PTW, which is referred to herein as a first PTW occasion or period or simply as a first PTW (PTW1), the UE 12 acquires a first CGI (CGI1) of its serving cell (cell1). If the UE 12 is configured with two or more serving cells, then the UE 12 may acquire the CGI of one or more than one serving cells or of all its serving cells. The UE 12 may create autonomous gaps to acquire the CGI of each serving cell. The UE 12 may acquire CGI1 during any time associated with PTW1. The term "any time associated with PTW1" as used herein means any of the following time periods: during PTW1, immediately before PTW1, and immediately after PTW1. The advantage of acquiring CGI before or after PTW1 is that the UE 12 will not cause any interruption to the signals transmitted between the UE 12 and the serving cell. The UE 12 stores the information about the acquired CGI1, which will be used by the UE 12 at a future time (e.g., during the next PTW), as described below.

The UE 12 may decide to acquire CGI1 autonomously, based on a predefined rule, or based on a request/configuration received from the network node.

Step 100A (Optional): Acquiring Identifier of a Transmitter Associated with Cell1

In step 100A, the UE 12 may further acquire an identifier of a transmitter with status B, e.g., a TP meeting a certain criteria (e.g., the strongest or not weaker than a threshold) within a shared cell (cell1).

Step 102: Acquiring Identifier of Cell2 During Time Associated with PTW2

In one non-limiting example, the identifier is CGI, and cell2 is the strongest cell. The description may be extended or adapted, however, also for the case when either the identifier is not CGI or the status of cell2 is different from being the strongest cell.

The next occurrence of a PTW, which occurs after PTW1 in time, is referred to herein as a second PTW duration or simply a second PTW (PTW2). PTW1 and PTW2 may or may not occur during successive eDRX cycles. However, typically, PTW1 and PTW2 may occur during successive eDRX cycles. The UE 12 further acquires a second CGI (CGI2) of a strongest cell during any time associated with PTW2. The UE 12 may create autonomous gaps to acquire CGI2. The term "any time associated with PTW2" as used herein means any of the following time periods: during PTW2 and immediately before PTW2. The term "any time associated with PTW2" may also be interchangeably referred to herein as a verification time (Tverify).

The UE 12 may determine the strongest cell (cell2) during or before the start of PTW2 based on one or more UE radio measurements, e.g. path loss, RSRP, RSRQ, RS-SINR, Signal to Noise Ratio (SNR), etc. In one example, the UE 12 considers a cell to be the strongest cell provided its measured RSRQ is largest compared to the measured RSRQ of other cells. In another example, the UE 12 considers a cell to be the strongest cell provided its measured RSRP is largest compared to the measured RSRP of other cells. In yet another example, the UE 12 considers a cell to be the strongest cell provided its measured RSRP and/or RSRQ are largest compared to the measured RSRP and/or RSRQ of other cells. In yet another example, the UE 12 considers a cell to be the strongest cell provided its measured RSRP is at least above an RSRP_threshold. In yet another example, the UE 12 considers a cell to be the strongest cell provided its measured RSRQ is at least above an RSRQ_threshold. In yet another example, the UE 12 considers a cell to be the strongest cell provided its measured RSRP is at least above the RSRP_threshold and/or its measured RSRQ is above the RSRQ_threshold.

The UE 12 may decide to acquire CGI2 autonomously based on a predefined rule or based on a request or configuration received from the network node (e.g., a radio access node 14 of a serving cell of the UE 12). The UE 12 may also decide to acquire CGI2 when the UE 12 suspects, e.g., based on measurements, that the strongest cell during PTW2 is different than the serving cell during PTW1. The UE 12 may also decide to acquire CGI2 opportunistically when, for example, the UE 12 does not expect to be scheduled. Therefore, the UE 12 may not lose data due to autonomous gaps used for CGI2 acquisition.

Step 102A (Optional): Acquiring Identifier of a Transmitter Associated with Cell2

In this step, the UE 12 may further acquire an identifier of a transmitter with status B, e.g., a TP meeting a certain criteria (e.g., the strongest or not weaker than a threshold) within a shared cell (cell2).

Step 104: Performing UE Radio Procedures Based on Comparison of Identifiers Acquired During Times Associated with PTW1 and PTW2

In the example below, Step 104 is described for the serving cell (cell1 in status A1) and the strongest cell (cell2 in status A2).

In one embodiment, the UE 12 first determines whether the strongest cell identified by the UE 12 during PTW2 is the same as the serving cell of the UE 12 used during PTW1. The UE 12 can determine this by comparing CGI1 and CGI2, i.e. CGIs of the serving cell in PTW1 and of the strongest cell in PTW2. Note that, at least in some embodiments, the strongest cell in PTW2 is the serving cell of the UE 12 during PTW2 since a separate cell reselection procedure is performed to reselect the strongest cell as the serving cell of the UE 12, e.g., at least once every DRX cycle. Based on such comparison the UE 12 performs the following tasks:

Cell1 and cell2 are assumed to be the same if CGI1 and CGI2 are identical. In this case, the UE 12 performs one or more first type of radio operations with respect to cell2. The radio operation performed by the UE 12 is also interchangeably referred to herein as an action, task, procedure, RRM task, etc. The first type of radio operations are the same or similar to those performed by the UE 12 when it was served by cell1 during PTW1. For example, in this case, the UE 12 may perform one or more of the following tasks:

RLM on signals of cell2. For example, it may be predefined that the UE 12, under eDRX operation or when configured with eDRX, shall perform RLM on a cell during PTW only after it has been verified (e.g., based on CGI) that the cell is the serving cell of the UE 12.

One or more radio measurements on signals of cell2 and/or one or more neighbor cells.

Receive one or more control channels of cell2.

Transmit and/or receive signals from cell2 based on the received scheduling information from the network node.

Send an indication to the network node informing the network node that cell1 and cell2 during PTW1 and PTW2, respectively, are the same, e.g. have the same CGIs.

Perform any other tasks related to the serving cell of the UE, e.g. estimation of CSI (e.g., CQI, Rank Indicator (RI), PMI, etc.) for cell2 and reporting the CSI results to the network node.

Cell1 and cell2 are assumed to be different if CGI1 and CGI2 are not identical. In this case, the UE 12 performs one or more second type of radio operations with respect to cell2. The second type of radio operations are typically different than those performed by the UE 12 when it was served by cell1 during PTW1. For example, in this case, the UE 12 may perform one or more of the following tasks:

Do not perform or stop performing any RLM on any signals of cell2 or of any other cell. For example, it may be predefined that the UE 12, under eDRX operation or when configured with eDRX, shall not perform RLM on a cell during PTW if it has not been verified (e.g., based on CGI) that the current cell is the serving cell of the UE 12.

Ignore any scheduling grant received from cell2.

Do not transmit any data in the uplink on the serving cell.

Go to idle state if the UE 12 is in connected state.

Determine if the UE 12 has to change the tracking area or registration area, i.e. cell2 belongs to a different tracking area compared to the tracking area of cell1.

Perform a tracking area update if cell2 does not belong to the old tracking area.

Initiate RRC reestablishment, e.g. send random access to cell2 to re-establish connection to cell2 as new serving cell, etc.

After establishing a connection to cell2, the UE 12 may also send an indication to the network node informing the network node that cell1 and cell2 during PTW1 and PTW2, respectively, are not the same, e.g. have different CGIs. The UE 12 may also send the acquired CGIs of cell1 and cell2 to the network node.

Transmit measurement results of measurements done on cell2 (e.g., RSRP, RSRQ, etc.) to the network node after establishing connection to the cell.

Step 104A (Optional): Perform Procedures Based on Comparison of Transmitter Identifiers Obtained During the Time Associated with PTW1 and PTW2

If the first and the second identifiers are the same, the UE 12 performs one of the following:
- a third type of UE radio operations if the third and the fourth identifiers are the same; and
- a fourth type of UE radio operations if the third and the fourth identifiers are different.

Some examples of the third and fourth type of UE radio operations are the same as described for the first and the second types of UE radio operations, respectively, but with respect to a transmitter instead of a cell. Thus, the third type of UE operations include, at least in some embodiments, one or more of the following:
- performing RLM on signals of the second transmitter;
- performing one or more radio measurements on signals of the second transmitter;
- performing one or more radio measurements on signals of one or more neighbor cells;
- receiving one or more control channels of the second transmitter;
- transmitting signals to and/or receiving signals from the second transmitter based on scheduling information received from a network node;
- sending an indication to a network node that informs the network node that the first transmitter and the second transmitter are the same; and
- performing, on the second transmitter, one or more tasks related to a serving cell of the wireless communication device.

Similarly, the fourth type of UE operations include, at least in some embodiments, one or more of the following:
- refraining from performing RLM on signals of the second transmitter;
- ignoring any scheduling grant received from the second transmitter;
- refraining from transmitting any data in an uplink to the second transmitter;
- entering idle mode if the UE 12 is in a connected state;
- determining whether the UE 12 needs to change a tracking area or registration area of the UE 12 based on whether the second transmitter belongs to a different tracking area or registration area as compared to that of the first transmitter;
- performing a tracking area update if the second transmitter does not belong to a previous tracking area of the UE 12;
- initiating a connection reestablishment to re-establish a connection to the second transmitter as a serving TP of the UE 12;
- sending an indication to a network node that informs the network node that the first transmitter and the second transmitter are different; and
- sending measurement results of measurements performed on the second transmitter to a network node.

FIG. 11 is a flow chart that illustrates methods in a network node (e.g., in a radio access node 14) for verification of a serving cell of a UE 12 under eDRX operation according to some embodiments of the present disclosure. In other words, FIG. 11 is a flow chart that illustrates methods in a network node (e.g., a radio access node 14) serving a UE 12 configured with an eDRX cycle, comprising the steps of:

Step 200: The network node obtains a first identifier of a first cell (cell1) with status A1 (e.g., serving) of the UE 12 during any time associated with a first PTW (PTW1) duration of the configured eDRX cycle.

Step 200A (optional): The network node obtains a third identifier of a first transmitter with status B1 associated with cell1 of the UE 12 during any time associated with the first PTW (PTW1) duration of the configured eDRX cycle.

Step 202: The network node obtains a second identifier of a second cell (cell2) with status A2 (e.g., strongest) of the UE during any time associated with a second PTW (PTW2) duration of the configured eDRX cycle, wherein PTW2 occurs after PTW1 in time.

Step 202A (optional): The network node obtains a fourth identifier of a second transmitter with status B2 associated with cell2 of the UE 12 during any time associated with the second PTW (PTW2) duration of the configured eDRX cycle, wherein PTW2 occurs after PTW1 in time.

Step 204: The network node performs one of the following:
- a first type of network node related radio operations if the first and the second identifiers are the same; and
- a second type of network node related radio operations if the first and the second identifiers are different.

Step 204A (optional): if the first and the second identifiers are the same, the network node performs one of the following:
- a third type of network node related radio operations if the third and the fourth identifiers are the same; and
- a fourth type of network node related radio operations if the third and the fourth identifiers are different.

The term "status" may be the same as described above. The above steps performed by the network node are elaborated below.

Step 200: Obtaining Identifier of Cell1 During Time Associated with PTW1

The embodiments below are described for a non-limiting example in which the status of cell1 is the serving cell and the identifier is CGI.

In step 200, the network node first determines that the UE 12 is configured to operate with eDRX cycle based on the eDRX configuration information sent to the UE 12 from the network node. The network node further determines the serving cell (cell1) of the UE 12 during a certain PTW, referred to herein as a first PTW occasion or period or simply a first PTW (PTW1). The network node further determines a first CGI (CGI1) of the serving cell (cell1) of the UE 12. The CGI1 associated with cell1 is typically stored in the network node. The network node may also receive the CGI1 from another network node. If the UE 12 is configured with two or more serving cells, then the network node may obtain the CGI of one or more than one serving cell or of all the serving cells of that UE 12. The network node may obtain CGI1 during any time associated with PTW1. The term "any time associated with PTW1" as used herein means any of the following time periods: during PTW1, immediately before PTW1, and immediately after PTW1. The network node stores the information about the acquired CGI1 and the associated cell1 of the UE 12. This information will be used by the network node at a future time (e.g., during the next PTW), as described below.

Step 200A (Optional): Obtaining Identifier of a First Transmitter Associated with Cell1 During the Time Associated with PTW1

According to this step, the network node may further determine an identifier of a first transmitter with status B1 associated with cell1.

Step 202: Obtaining Identifier of Cell2 During Time Associated with PTW2

The embodiments below are described for a non-limiting example in which the status of cell2 is the strongest cell and the identifier is CGI.

The network node further determines a second CGI (CGI2) of a strongest cell (cell2) of the UE 12 during any time associated with PTW2. The information about CGI2 can typically be retrieved from the memory of the network node, i.e. CGI2 associated with cell2. The information about CGI2 may also be determined by the network node by receiving it from another network node, i.e. receiving an association between CGI2 and cell2.

PTW2 occurs after PTW1. The PTW2 may or may not occur during successive PTW occasions. For example, the network node may decide based on one or more criteria during which PTW the CGI2 needs to be determined. For example, if the eDRX cycle length of the UE 12 is below a threshold (e.g., 20.48 seconds), then the network node may determine CGI2 of cell2 during PTW, which does not occur immediately after PTW1. This is because, for shorter eDRX cycle lengths, the serving cell of the UE 12 is not expected to change between successive PTWs. On the other hand, if the eDRX cycle length is equal to or larger than a threshold (e.g., 20.48 seconds), then the network node may determine CGI2 of cell2 during PTW, which may occur immediately after PTW1, i.e. PTW2 and PTW1 are during successive PTWs of the eDRX cycle. This is because, under longer eDRX cycle lengths, the serving cell of the UE 12 may change even between successive PTWs.

The term "any time associated with PTW2" as used herein means any of the following time periods: during PTW2 and immediately before PTW2. The term "any time associated with PTW2" may also be interchangeably referred to herein as a verification time (Tverify).

The network node may determine the strongest cell (cell2) of the UE 12 during or before the start of PTW2 based on one or more UE radio measurements, e.g. path loss, RSRP, RSRQ, RS-SINR, SNR, etc. In yet another example, the network node may measure the signal received from the UE 12 in one or more cells and determine the strongest cell based on received signal level, e.g. the cell where SNR is the highest is the strongest cell of the UE 12. The UE 12 may report such measurement results of measurements (e.g., RSRP, RSRQ, etc.) done on cell2 to the network node before the start of PTW2. In one example, the UE 12 may send the measurement results associated with only the strongest cell, i.e. cell2. In another example, the UE 12 may send the measurement results associated with two or more cells, and the network node determines the strongest cell (i.e., cell2) of the UE 12 based on one or more criteria. The network node may consider a cell to be the strongest cell provided the measured RSRQ is largest compared to the measured RSRQ of other cells. In another example, the network node considers a cell to be the strongest cell provided its measured RSRP is largest compared to the measured RSRP of other cells. In yet another example, the network node considers a cell to be the strongest cell provided its measured RSRP and/or RSRQ are largest compared to the measured RSRP and/or RSRQ of other cells. In yet another example, the network node considers a cell to be the strongest cell provided its measured RSRP is at least above an RSRP_threshold. In yet another example, the network node considers a cell to be the strongest cell provided its measured RSRQ is at least above an RSRQ_threshold. In yet another example, the network node considers a cell to be the strongest cell provided its measured RSRP is at least above the RSRP_threshold and/or its measured RSRQ is above the RSRQ_threshold.

The network node may decide to acquire CGI2 autonomously based on a predefined rule or based on a request or configuration received from another network node. The network node may also decide to acquire CGI2 of cell2 when it suspects that the strongest cell of the UE 12 during PTW2 is different than the serving cell during the previous PTW, i.e. PTW1. The network node may also decide to determine CGI2 opportunistically when for example the network node is expected to schedule data to the UE 12 in the uplink and/or downlink. The UE 12 may be scheduled for example when the network node has data in its buffer for the UE 12.

Step 202A (Optional): Obtaining Identifier of a Second Transmitter Associated with Cell2 During Time Associated with PTW2

According to this step, the network node may further determine an identifier of a second transmitter with status B2 associated with cell2.

Step 204: Performing Network Node Radio Procedures Based on Comparison of Identifiers Obtained During Times Associated with PTW1 and PTW2

In this step, the network node first determines whether or not the strongest cell of the UE 12 during PTW2 is the same as the serving cell of the UE 12 during PTW1. The network node can determine this by comparing the determined CGI1 and CGI2, i.e. CG Is of the serving cell in PTW1 and of the strongest cell in PTW2. Based on such comparison, the network node performs the following tasks:

Cell1 and cell2 are assumed to be the same if CGI1 and CGI2 are identical. In this case, the network node performs one or more first type of network node related radio operations with respect to cell2. The radio operation performed by the network node is also interchangeably referred to herein as an action, task, procedure, RRM task, etc. The first type of network node radio operations are the same or similar to those performed by the network node when the UE 12 was served by cell1 during PTW1. For example, in this case, the network node may perform one or more of the following tasks:
  Configure the UE 12 with one or more parameters for enabling the UE 12 to perform RLM on signals on cell2; the parameters are typically the same as used in cell1;
  Schedule the UE 12 in the uplink and/or downlink on cell2 without any delay if there is any data for the UE 12 in the buffer;
  Receive an indication from the UE 12 informing the network node that the UE 12 has identified cell1 and cell2 during PTW1 and PTW2, respectively, are the same, e.g. have the same CGIs;

Receive one or more measurement results from the UE 12 and use them for one or more operations, e.g. CSI (e.g., CQI, RI, PMI, etc.) for scheduling in cell2, etc.

Cell1 and cell2 are assumed to be different if CGI1 and CGI2 are not identical. In this case, the network node performs one or more of a second type of network node radio operations with respect to cell2. The second type of network node radio operations are typically different than those performed by the network node when the UE 12 was served by cell1 during PTW1. For example, in this case, the network node may perform one or more of the following tasks:

Do not schedule the UE 12 with data in the uplink and/or downlink in cell2;

Schedule the UE 12 with data in the uplink and/or downlink with a certain delay, e.g. after the UE 12 has established or reestablished connection to cell2, i.e. cell2 has become a new serving cell of the UE 12;

Prepare the reception of a random access message or a message from the UE 12 for establishing a connection to cell2;

Ignore any data transmitted by the UE 12 unless the UE 12 has established a connection to cell2;

Prepare the reception of a message from the UE 12 informing the network node that cell1 and cell2 during PTW1 and PTW2, respectively, are not the same, e.g. have different CG Is.

Step 204A (Optional): Perform Procedures Based on Comparison of Transmitter Identifiers Obtained During the Time Associated with PTW1 and PTW2

If the first and the second cell identifiers are the same, the network node performs one of the following:

a third type of network node related radio operations if the third and the fourth transmitter identifiers are the same; and a fourth type of network node related radio operations if the third and the fourth transmitter identifiers are different.

Some examples of the third and fourth type of radio operations are the same as described above for the first and the second types of network node related radio operations, respectively, but with respect to a transmitter instead of a cell. Thus, the third type of radio operations include, at least in some embodiments, one or more of the following:

configuring the UE 12 with one or more parameters for enabling the UE 12 to perform RLM on signals of the second transmitter;

scheduling the UE 12 in an uplink and/or downlink on the at least one second cell without delay to make the at least one second cell a new serving cell of the UE 12;

receiving an indication from the UE 12 that informs the network node that the UE 12 has identified the at least one first cell and the at least one second cell as being the same; and receiving one or more measurement results from the UE 12 and using the one or more measurements for one or more operations for scheduling in the at least one second cell.

Similarly, the fourth type of radio operations include, at least in some embodiments, one or more of the following:

refraining from scheduling the UE 12 for uplink and/or downlink data transmission in the at least one second cell;

scheduling the UE 12 for uplink and/or downlink data transmission in the at least one second cell only after a delay to make the at least one second cell a new serving cell of the UE 12;

preparing reception of a random access message or a message from the UE 12 for establishing a connection to the at least one second cell;

ignoring any data transmitted by the UE 12 unless the UE 12 has established a connection with the at least one second cell; and preparing reception of a message from the UE 12 that informs the network node that the at least one first cell and the at least one second cell are not the same.

The described embodiments allow for one or more of the following advantages:

The disclosed methods enable the UE 12 configured with an eDRX cycle to uniquely and unambiguously identify whether its serving cell has changed or not across different PTW occasions within the eDRX cycle. If the serving cell has changed, then the UE 12 first establishes a connection with the new serving cell before performing any task (e.g., RLM). But otherwise if the serving cell has not changed across different PTWs, then the UE 12 can continue performing the existing operations.

The methods ensure that the UE 12 is able to uniquely determine whether its serving cell has changed or not between different PTW occasions when the UE 12 is configured with very long eDRX cycle length, e.g. in order of minutes, hours, etc.

The methods avoid or minimize the loss of scheduling grant and data during the PTW when the UE 12 is configured with very long eDRX cycle length, e.g. in order of minutes, hours, etc.

The methods ensure that the UE 12 is able to inform the network node in case its serving cell has changed across different PTW occasions.

The methods ensure that the network node becomes aware of the fact whether or not the serving cell of the UE 12 has changed between different PTW occasions of the eDRX cycle. This in turn allows the network to avoid the loss of scheduling resources.

The methods to ensure that the transmitter of interest has not changed its status in the second PTW, e.g., it is still the strongest or the serving transmitter or the neighbor transmitter.

Various other features and advantages will become obvious to one of ordinary skill in the art in light of the following detailed description and drawings.

As a non-limiting example, a sample of one possible change to 3GPP TSG-RAN WG4 36.133 is provided below. It should be noted that the specific changes are merely for illustrative purposes of one embodiment disclosed herein, and various other or alternative changes, in any combination, could be made to these sections (or other sections), and/or other standards, within the scope of the present disclosure.

3 Definitions, Symbols and Abbreviations 3.1 Definitions

For the purposes of the present document, the terms and definitions given in TR 21.905 [26] and the following apply. A term defined in the present document takes precedence over the definition of the same term, if any, in TR 21.905 [26].

Any Cell Selection state: as defined in TS 36.304 [1]
Asynchronous Dual Connectivity: As defined in TS 36.300 [25].

Carrier aggregation: aggregation of two or more component carriers in order to support wider transmission bandwidths TS 36.104 [30].

Dual Connectivity: As defined in TS 36.300 [25].

Extended IDLE-mode DRX: extended DRX cycles in IDLE mode as specified in TS 24.008 [34], where one extended DRX cycle is a time period between two first paging occasions within two consecutive PTWs.

Extended CONNECTED-mode DRX: extended DRX cycles in CONNECTED mode as specified in TS 36.331 [2].

High operating band: an operating band with a higher downlink frequency with respect to another, low, operating band.

Inter-band carrier aggregation: carrier aggregation of component carriers in different operating bands TS 36.104 [30].

Intra-band contiguous carrier aggregation: contiguous carriers aggregated in the same operating band TS 36.104 [30].

Intra-band non-contiguous carrier aggregation: non-contiguous carriers aggregated in the same operating band TS 36.104 [30].

IDC autonomous denial subframes: The maximum number of uplink subframes in which the UE is allowed not to transmit E-UTRAN signals when configured with IDC autonomous denial (TS 36.331 [2]).

IDC autonomous denial validity: It is the period over which the autonomous denial subframes are counted (TS 36.331 [2]).

IDC solution: This refers to DRX or IDC autonomous denial configured by eNodeB in response to receiving InDeviceCoexIndication from the UE (TS 36.331 [2]).

Low operating band: an operating band with a lower downlink frequency with respect to another, high, operating band.

Master Cell Group: As defined in TS 36.300 [25].
Master eNB: As defined in TS 36.300 [25]. MBSFN ABS: ABS configured in MBSFN-configurable subframe.
Non-MBSFN ABS: ABS configured in any downlink subframe.
Normal Performance Group: For UE which supports Increased UE carrier monitoring UTRA or E-UTRA the group of inter-frequency carriers or inter-RAT carriers is divided into two groups. The group which has a better delay performance compared to the other group is referred to as the normal performance group
Paging Time Window: As defined in TS 24.008 [34].
Primary Cell: As defined in TS 36.331 [2].
ProSe Direct Communication: As defined in TS 23.303 [33]
ProSe Direct Discovery: As defined in TS 23.303 [33]
Primary SCell: As defined in TS 36.300 [25].
Primary Secondary Timing Advance Group: Timing Advance Group containing the PSCell.
Primary Timing Advance Group: Timing Advance Group containing the PCell.
Reduced Performance Group: For UE which supports Increased UE carrier monitoring UTRA or E-UTRA the group of inter-frequency carriers or inter-RAT carriers is divided into two groups. The group which has worse delay performance compared to the other group is referred to as the reduced performance group
Secondary Cell: As defined in TS 36.331 [2].
Secondary eNB: As defined in TS 36.300 [25].
Serving Cell: As defined in TS 36.331 [2].
Secondary Cell Group: As defined in TS 36.300 [25].
Secondary Timing Advance Group: As defined in TS 36.331 [2].
Synchronous Dual Connectivity: As defined in TS 36.300 [25].
TDD-FDD carrier aggregation: Carrier aggregation of component carriers in E-UTRA TDD and E-UTRA FDD operating bands TS 36.104 [30].
Timing Advance Group: As defined in TS 36.331 [2].
UE category 0 applicability: In this version of this specification the requirements for a UE category 0 are derived assuming UE category 0 [31] and a single antenna receiver.
x_RA: x-to-RS EPRE ratio for the channel or physical signal x in all transmitted OFDM symbols not containing RS.
x_RB: x-to-RS EPRE ratio for the channel or physical signal x in all transmitted OFDM symbols containing RS.

[1] ----------End of Change 1----------
[2] ----------Start of 2----------

3.3 Abbreviations

For the purposes of the present document, the abbreviations given in TR 21.905 [26] and the following apply. An abbreviation defined in the present document takes precedence over the definition of the same abbreviation, if any, in TR 21.905 [26].

1×RTT CDMA2000 1× Radio Transmission Technology
ABS Almost Blank Subframe
ARQ Automatic Repeat Request
AP Access Point
AWGN Additive White Gaussian Noise
BCCH Broadcast Control Channel
BCH Broadcast Channel
CA Carrier Aggregation
CC Component Carrier
CCCH SDU Common Control Channel SDU
CGI Cell Global Identifier
CPICH Common Pilot Channel
CPICH Ec/No CPICH Received energy per chip divided by the power density in the band
CRS Cell-specific Reference Signals
C-RNTI Cell RNTI
CSI Channel-State Information
CSI-RS CSI Reference Signal
DC Dual Connectivity
DCCH Dedicated Control Channel
DL Downlink
DMTC Discovery signal Measurement Timing Configuration
DRX Discontinuous Reception
DTCH Dedicated Traffic Channel
DUT Device Under Test
E-CID Enhanced Cell-ID (positioning method)
ECGI Evolved CGI
eDRX IDLE Extended IDLE-mode DRX
eDRX CONN Extended CONNECTED-mode DRX
eNB E-UTRAN NodeB
E-SMLC Enhanced Serving Mobile Location Centre
E-UTRA Evolved UTRA
E-UTRAN Evolved UTRAN
FDD Frequency Division Duplex
GERAN GSM EDGE Radio Access Network
GSM Global System for Mobile communication
HARQ Hybrid Automatic Repeat Request
HD-FDD Half-Duplex FDD HO Handover
HRPD High Rate Packet Data
IDC In-Device Coexistence
IEEE Institute of Electrical and Electronics Engineers
LPP LTE Positioning Protocol
LWA LTE-WLAN Aggregation
MAC Medium Access Control
MCG Master Cell Group
MeNB Master eNB
MBSFN Multimedia Broadcast multicast service Single Frequency Network
MBSFN ABS MBSFN Almost Blank Subframe
MDT Minimization of Drive Tests
MGRP Measurement Gap Repetition Period
MIB Master Information Block
OCNG OFDMA Channel Noise Generator
OFDM Orthogonal Frequency Division Multiplexing
OFDMA Orthogonal Frequency Division Multiple Access
OTDOA Observed Time Difference of Arrival
PBCH Physical Broadcast Channel
P-CCPCH Primary Common Control Physical Channel
PCell Primary Cell
PCFICH Physical Control Format Indicator CHannel
PDCCH Physical Downlink Control CHannel
PDSCH Physical Downlink Shared CHannel
PHICH Physical Hybrid-ARQ Indicator CHannel
PLMN Public Land Mobile Network
PMCH Physical Multicast Channel
PRACH Physical Random Access CHannel
ProSe Proximity-based Services
PRS Positioning Reference Signal
PSBCH Physical Sidelink Broadcast CHannel
PSCCH Physical Sidelink Control Channel
PSCell Primary SCell
PSS Primary Synchronization SignalPSSCH Physical Sidelink Shared CHannel
psTAG Primary Secondary Timing Advance Group
pTAG Primary Timing Advance Group
PTW Paging Time Window
PUCCH Physical Uplink Control CHannel
PUSCH Physical Uplink Shared Channel
RS-SINR Reference Signal Signal to Noise and Interference RatioRSCP Received Signal Code Power
RSRP Reference Signal Received Power
RSRQ Reference Signal Received Quality
RSSI Received Signal Strength Indicator
RSTD Reference Signal Time Difference
QAM Quadrature Amplitude Modulation
RACH Random Access Channel
RAT Radio Access Technology
RNC Radio Network Controller
RNTI Radio Network Temporary Identifier
RRC Radio Resource Control
RRM Radio Resource Management
SCE Small Cell Enhancement
SCH Synchronization Channel
SCell Secondary Cell
SCG Secondary Cell GroupSDU Service Data Unit
SeNB Secondary eNB
SFN System Frame Number
SI System Information
SIB System Information Block
SLSS SideLink Synchronization Sequence
SON Self Optimized Network
SRS Sounding Reference Signal
SSS Secondary Synchronization Signal
SSTD SFN and subframe time difference
sTAG Secondary Timing Advance Group
TAG Timing Advance Group
TDD Time Division Duplex
TP Transmission Point
TTI Transmission Time Interval
UE User Equipment
UL Uplink
UMTS Universal Mobile Telecommunication System
UTRA Universal Terrestrial Radio Access
UTRAN Universal Terrestrial Radio Access Network
WLAN Wireless Local Area Network
WB-RSRQ Wide Bandwith RSRQ

[3] ----------End of Change 2----------
[4] ----------Start of Change 3----------

E-UTRAN RRC_IDLE State Mobility 4.1 Cell Selection

After a UE has switched on and a PLMN has been selected, the Cell selection process takes place, as described in TS36.304. This process allows the UE to select a suitable cell where to camp on in order to access available services. In this process the UE can use stored information (Stored information cell selection) or not (Initial cell selection).

4.2 Cell Re-Selection 4.2.1 Introduction

The cell reselection procedure allows the UE to select a more suitable cell and camp on it.

When the UE is in either Camped Normally state or Camped on Any Cell state on a cell, the UE shall attempt to detect, synchronise, and monitor intra-frequency, inter-frequency and inter-RAT cells indicated by the serving cell. For intra-frequency and inter-frequency cells the serving cell may not provide explicit neighbour list but carrier frequency information and bandwidth information only. UE measurement activity is also controlled by measurement rules defined in TS36.304, allowing the UE to limit its measurement activity.

4.2.2 Requirements

The UE shall search every layer of higher priority at least every $T_{higher\_priority\_search}=(60*N_{layers})$ seconds when the UE is not configured with eDRX_IDLE cycle, and at least every $T_{higher\_priority\_search}=MAX(60*N_{layers},$ one eDRX_IDLE cycle) when UE is configured with eDRX_IDLE cycle, where $N_{layers}$ is the total number of configured higher priority E-UTRA, UTRA FDD, UTRA TDD, CDMA2000 1× and HRPD carrier frequencies and is additionally increased by one if one or more groups of GSM frequencies is configured as a higher priority.

In the requirements of Section 4.2.2 for the UE capable of CA, the applicable exceptions for side conditions are specified in Annex B, Section B.4.2.

For a UE which supports increased carrier monitoring E-UTRA or increased carrier monitoring UTRA, the reselection performance for different carriers may be configured by higher layers to be either normal or reduced. The following definitions are used in the requirements:

[1] $K_{carrier}$: Total number of interfrequency carriers in the neighbour cell list

[2] $K_{carrier,normal}=K_{carrier}-K_{carrier,reduced}$: Number of interfrequency carriers to be monitored in the normal performance group

[3] $K_{carrier,reduced}$: Number of interfrequency carriers to be monitored in the reduced performance group

[4] $N_{UTRA\_carrier}$: Total number of configured UTRA FDD carriers in the neighbour cell list

[5] $N_{UTRA\_carrier,normal} = N_{UTRA\_carrier} - N_{UTRA\_carrier,reduced}$: Number of UTRA FDD carriers to be monitored in the normal performance group

[6] $N_{UTRA\_carrier,reduced}$: Number of UTRA FDD carriers to be monitored in the reduced performance group

[7] $N_{UTRA\_carrier\_TDD}$: Total number of configured UTRA TDD carriers in the neighbour cell list

[8] $N_{UTRA\_carrier\_TDD,normal} = N_{UTRA\_carrier\_TDD} - N_{UTRA\_carrier\_TDD,reduced}$: Number of UTRA TDD carriers to be monitored in the normal performance group

[9] $N_{UTRA\_carrier\_TDD,reduced}$: Number of UTRA TDD carriers to be monitored in the reduced performance group The minimum performance requirements for a UE which supports Increased UE carrier monitoring E-UTRA [2, 31] are calculated as defined in section 4.2.2.4 provided that $K_{carrier,normal} \leq 3$ and the minimum performance requirements for a UE which supports Increased UE carrier monitoring UTRA [2, 31] are calculated as defined in section 4.2.2.5 provided that $N_{UTRA\_carrier\_normal} \leq 3$ and $N_{UTRA\_carrier\_TDD,normal} \leq 3$. In case the limits for the number of normal performance carriers is exceeded considering the broadcast neighbour cell list and the bands supported by the UE, the UE which supports Increased UE carrier monitoring E-UTRA shall measure at least 3 interfrequency carriers with normal performance and the UE which supports Increased UE carrier monitoring UTRA shall measure at least 3 UTRA carriers with normal performance. Additionally, reduced performance requirements shall be met for carriers for which the Reduced measurement performance IE is indicated, up to the UE measurement capability in section 4.2.2.9a. The minimum performance requirements for a UE which does not support Increased UE carrier monitoring E-UTRA [2,31] are calculated assuming all E-UTRA carriers required to be monitored for such UE, are having normal performance and are in normal performance group, i.e. $K_{carrier,normal} = K_{carrier}$ and $K_{carrier,reduced} = 0$. The minimum performance requirements for a UE which does not support Increased UE carrier monitoring UTRA [2,31] are calculated assuming all UTRA carriers required to be monitored for such UE, are having normal performance and are in normal performance group, i.e. $N_{UTRA\_carrier,normal} = N_{UTRA\_carrier}$, $N_{UTRA\_carrier\_TDD,normal} = N_{UTRA\_carrier\_TDD}$ and $N_{UTRA\_carrier,reduced} = 0$ and $N_{UTRA\_carrier\_TDD,reduced} = 0$. No reduced performance carrier requirement applies to a UE not supporting Increased UE carrier monitoring E-UTRA or UTRA [2, 31]. Capabilities for number of carriers to monitor for a UE which does not support Increased carrier monitoring E-UTRA or Increased carrier monitoring UTRA are specified in section 4.2.2.9

4.2.2.1 Measurement and Evaluation of Serving Cell

The UE shall measure the RSRP and RSRQ level of the serving cell and evaluate the cell selection criterion S defined in [1] for the serving cell at least every DRX cycle.

The UE shall filter the RSRP and RSRQ measurements of the serving cell using at least 2 measurements. Within the set of measurements used for the filtering, at least two measurements shall be spaced by, at least DRX cycle/2.

If the UE k not configured with eDRX_IDLE cycle and has evaluated according to Table 4.2.2.1-1 in $N_{serv}$, consecutive DRX cycles that the serving cell does not fulfil the cell selection criterion S, the UE shall initiate the measurements of all neighbour cells indicated by the serving cell, regardless of the measurement rules currently limiting UE measurement activities. If the UE is configured with eDRX_IDLE cycle and has evaluated according to Table 4.2.2.1-2 in $N_{serv}$ consecutive DRX cycles within a single PTW that the serving cell does not fulfil the cell selection criterion S, the UE shall initiate the measurements of at least all neighbour cells configured with eDRX indicated by the serving cell, regardless of the measurement rules currently limiting UE measurement activities.

If the UE in RRC_IDLE has not found any new suitable cell based on searches and measurements using the intra-frequency, inter-frequency and inter-RAT information indicated in the system information during the time T, the UE shall initiate cell selection procedures for the selected PLMN as defined in [1], where T=10 s, if the UE is not configured with eDRX_IDLE cycle, and T=MAX(10 s, one eDRX_IDLE cycle) if the UE is configured with eDRX_IDLE cycle.

When the UE is configured with eDRX_IDLE, the requirements in this section apply provided that the serving cell is the same in all PTWs during the measurement and evaluation time.

TABLE 4.2.2.1-1

$N_{serv}$

| DRX cycle length [s] | $N_{serv}$ [number of DRX cycles] |
| --- | --- |
| 0.32 | 4 |
| 0.64 | 4 |
| 1.28 | 2 |
| 2.56 | 2 |

TABLE 4.2.2.1-2

$N_{serv}$ for UE configured with eDRX IDLE cycle

| DRX cycle length [s] | PTW length [s] | $N_{serv}$ [number of DRX cycles] |
| --- | --- | --- |
| 0.32 | ≥1 | 2 |
| 0.64 | ≥2 | 2 |
| 1.28 | ≥3 | 2 |
| 2.56 | ≥6 | 2 |

For any requirement in this section, when the UE transitions between any two of the states of not being configured with eDRX_IDLE, being configured with eDRX_IDLE cycle, changing eDRX_IDLE cycle length, and changing PTW configuration, the UE shall meet the transition requirement, which is the less stringent requirement of the two requirements corresponding to the first mode and the second mode, during the transition time interval which is the time corresponding to the transition requirement. After the transition time interval, the UE has to meet the requirement corresponding to the second mode.

4.2.2.2 Void

4.2.2.3 Measurements of Intra-Frequency E-UTRAN Cells

The UE shall be able to identify new intra-frequency cells and perform RSRP and RSRQ measurements of identified intra-frequency cells without an explicit intra-frequency neighbour list containing physical layer cell identities.

The UE shall be able to evaluate whether a newly detectable intra-frequency cell meets the reselection criteria defined in TS36.304 within $T_{detect,EUTRAN\_Intra}$ when that Treselection=0. An intra frequency cell is considered to be detectable according to RSRP, RSRP Ês/Iot, SCH_RP and SCH Ês/Iot defined in Annex B.1.1 for a corresponding Band.

The UE shall measure RSRP and RSRQ at least every $T_{measure,EUTRAN\_Intra}$ for intra-frequency cells that are identified and measured according to the measurement rules.

The UE shall filter RSRP and RSRQ measurements of each measured intra-frequency cell using at least 2 measurements. Within the set of measurements used for the filtering, at least two measurements shall be spaced by at least $T_{measure,EUTRAN\_Intra}/2$.

The UE shall not consider a E-UTRA neighbour cell in cell reselection, if it is indicated as not allowed in the measurement control system information of the serving cell.

For an intra-frequency cell that has been already detected, but that has not been reselected to, the filtering shall be such that the UE shall be capable of evaluating that the intra-frequency cell has met reselection criterion defined [1] within $T_{evaluate,E-UTRAN\_intra}$ when $T_{reselection}=0$, provided that the cell is at least 3 dB better ranked. When evaluating cells for reselection, the side conditions for RSRP and SCH apply to both serving and non-serving intra-frequency cells.

If $T_{reselection}$ timer has a non zero value and the intra-frequency cell is better ranked than the serving cell, the UE shall evaluate this intra-frequency cell for the $T_{reselection}$ time. If this cell remains better ranked within this duration, then the UE shall reselect that cell.

For UE not configured with eDRX_IDLE cycle, $T_{detect,EUTRAN\_Intra}$ and $T_{measure,EUTRAN\_Intra}$ and $T_{evaluate,E-UTRAN\_intra}$ are specified in Table 4.2.2.3-1. For UE configured with eDRX_IDLE cycle, $T_{detect,EUTRAN\_Intra}$, $T_{measure,EUTRAN\_Intra}$ and $T_{evaluate,E-UTRAN\_intra}$ are specified in Table 4.2.2.3-2, where the requirements apply provided that the serving cell is the same in all PTWs during any of $T_{detect,EUTRAN\_Intra}$, $T_{measure,EUTRAN\_Intra}$ and $T_{evaluate,E-UTRAN\_intra}$ when multiple PTWs are used.

TABLE 4.2.2.3-1

$T_{detect,EUTRAN\_Intra}$, $T_{measure,EUTRAN\_Intra}$ and $T_{evaluate,E-UTRAN\_intra}$

| DRX cycle length [s] | $T_{detect,E-UTRAN\_Intra}$ [s] (number of DRX cycles) | $T_{measure,E-UTRAN\_Intra}$ [s] (number of DRX cycles) | $T_{evaluate,E-UTRAN\_intra}$ [s] (number of DRX cycles) |
| --- | --- | --- | --- |
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

TABLE 4.2.2.3-2

$T_{detect,EUTRAN\_Intra}$ $T_{measure,EUTRAN\_Intra}$ and $T_{evaluate,\ E-UTRAN\_intra}$ for UE configured with eDRX_IDLE cycle

| DRX cycle length, DRX [s] | PTW length [s] | $T_{detect,EUTRAN\_Intra}$ [s] (number of DRX cycles) | $T_{measure,EUTRAN\_Intra}$ [s] (number of DRX cycles) | $T_{evaluate,E-UTRAN\_intra}$ [s] (number of DRX cycles) |
| --- | --- | --- | --- | --- |
| 0.32 | ≥1 | eDRX_cycle_length× $\left\lceil \frac{23}{\lceil PTW/DRX\_cycle\_length \rceil} \right\rceil$ (23) | 0.32 (1) | 0.64 (2) |
| 0.64 | ≥2 | | 0.64 (1) | 1.28 (2) |
| 1.28 | ≥3 | | 1.28 (1) | 2.56 (2) |
| 2.56 | ≥6 | | 2.56 (1) | 5.12 (2) |

For any requirement in this section, when the UE transitions between any two of the states of not being configured with eDRX_IDLE, being configured with eDRX_IDLE cycle, changing eDRX_IDLE cycle length, and changing PTW configuration, the UE shall meet the transition requirement, which is the less stringent requirement of the two requirements corresponding to the first mode and the second mode, during the transition time interval which is the time corresponding to the transition requirement. After the transition time interval, the UE has to meet the requirement corresponding to the second mode.

4.2.2.4 Measurements of Inter-Frequency E-UTRAN Cells

The UE shall be able to identify new inter-frequency cells and perform RSRP or RSRQ measurements of identified inter-frequency cells if carrier frequency information is provided by the serving cell, even if no explicit neighbour list with physical layer cell identities is provided.

If Srxlev>$S_{nonIntraSearchP}$ and Squal>$S_{nonIntraSearchQ}$ then the UE shall search for inter-frequency layers of higher priority at least every $T_{higher\_priority\_search}$ where $T_{higher\_priority\_search}$ is described in clause 4.2.2.

If Srxlev≤$S_{nonIntraSearchP}$ or Squal≤$S_{nonIntraSearchQ}$ then the UE shall search for and measure inter-frequency layers of higher, equal or lower priority in preparation for possible reselection. In this scenario, the minimum rate at which the UE is required to search for and measure higher priority layers shall be the same as that defined below.

If the UE is not configured with eDRX_IDLE cycle or configured with an eDRX_IDLE cycle not longer than 20.48 s, the UE shall be able to evaluate whether a newly detectable inter-frequency cell in normal performance group meets the reselection criteria defined in TS36.304 within $K_{carrier,normal}*T_{detect,EUTRAN\_Inter}$ and able to evaluate whether a newly detectable inter-frequency cell in reduced performance group meets the reselection criteria defined in TS36.304 within $6*K_{carrier,reduced}*T_{detect,EUTRAN\_Inter}$ if at least carrier frequency information is provided for inter-frequency neighbour cells by the serving cells when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities. If the UE is configured with eDRX_IDLE cycle longer than 20.48 s, the UE shall be able to evaluate whether a newly detectable inter-frequency cell in normal performance group meets the reselection criteria defined in TS36.304 within $K_{carrier,normal}*T_{detect,EUTRAN\_Inter}$, and when Srxlev<3 dB or Squal<3 dB able to evaluate whether a newly detectable inter-frequency cell in reduced performance group meets the reselection criteria defined in TS36.304 within $6*K_{carrier,reduced}*T_{detect,EUTRAN\_Inter}$ if at least carrier frequency information is provided for inter-frequency neighbour cells by the serving cells when $T_{selection}=0$ provided that the reselection criteria is met by a margin of at least 5 dB for reselections based on ranking or 6 dB for RSRP reselections based on absolute priorities or 4 dB for RSRQ reselections based on absolute priorities. An inter-frequency cell is considered to be detectable according to RSRP, RSRP Ês/Iot, SCH_RP and SCH Ês/Iot defined in Annex B.1.2 for a corresponding Band.

When higher priority cells are found by the higher priority search, they shall be measured at least every $T_{measure,E-UTRAN\_Inter}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell. If the UE detects on a E-UTRA carrier a cell whose physical identity is indicated as not allowed for that carrier in the measurement control system information of the serving cell, the UE is not required to perform measurements on that cell.

If the UE is configured with eDRX_IDLE cycle not longer than 20.48 s, the UE shall measure RSRP or RSRQ at least every $K_{carrier,normal}*T_{measure,EUTRAN\_Inter}$ for identified lower or equal priority inter-frequency cells in normal performance group, and at least every $6*K_{carrier,reduced}*T_{measure,EUTRAN\_Inter}$ for identified lower or equal priority inter-frequency cells in reduced performance group. If the UE is configured with eDRX_IDLE cycle longer than 20.48 s, the UE shall measure RSRP or RSRQ at least every $K_{carrier,normal}*T_{measure,EUTRAN,Inter}$ for identified lower or equal priority inter-frequency cells in normal performance group, and when Srxlev<3 dB or Squal<3 dB at least every $6*K_{carrier,reduced}*T_{measure,EUTRAN\_Inter}$ for identified lower or equal priority inter-frequency cells in reduced performance group. If the UE detects on a E-UTRA carrier a cell whose physical identity is indicated as not allowed for that carrier in the measurement control system information of the serving cell, the UE is not required to perform measurements on that cell.

The UE shall filter RSRP or RSRQ measurements of each measured higher, lower and equal priority inter-frequency cell using at least 2 measurements. Within the set of measurements used for the filtering, at least two measurements shall be spaced by at least $T_{measure,EUTRAN\_Inter}/2$.

The UE shall not consider a E-UTRA neighbour cell in cell reselection, if it is indicated as not allowed in the measurement control system information of the serving cell.

If the UE is configured with eDRX_IDLE cycle not longer than 20.48 s, for an inter-frequency cell that has been already detected, but that has not been reselected to, the filtering shall be such that the UE shall be capable of evaluating that the inter-frequency cell in normal performance group has met reselection criterion defined TS 36.304 within $K_{carrier,normal}*T_{evaluate,E-UTRAN\_Inter}$, and capable of evaluating that the inter-frequency cell in reduced performance group has met reselection criterion defined TS 36.304 within $6*K_{carrier,reduced}*T_{evaluate,E-UTRAN\_Inter}$, when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities. If the UE is configured with eDRX_IDLE cycle longer than 20.48 s, for an inter-frequency cell that has been already detected, but that has not been reselected to, the filtering shall be such that the UE shall be capable of evaluating that the infer-frequency cell in normal performance group has met reselection criterion defined TS 36.304 within $K_{carrier,normal}*T_{evaluate,E-UTRAN\_Inter}$, and when Srxlev<3 dB or Squal<3 dB capable of evaluating that the inter-frequency cell in reduced performance group has met reselection criterion defined TS 36.304 within $6*K_{carrier,reduced}*T_{evaluate,E-UTRAN\_Inter}$, when $T_{reselection}=0$ provided that the reselection criteria is ret by a margin of at least 5 dB for reselections based on ranking or 6 dB for RSRP reselections based on absolute priorities or 4 dB for RSRQ reselections based on absolute priorities. When evaluating cells for reselection, the side conditions for RSRP and SCH apply to both serving and inter-frequency cells.

If $T_{reselection}$ timer has a non zero value and the inter-frequency cell is better ranked than the serving cell, the UE shall evaluate this inter-frequency cell for the $T_{reselection}$ time. If this cell remains better ranked within this duration, then the UE shall reselect that cell.

For UE not configured with eDRX_IDLE cycle, $T_{detect,EUTRAN\_Inter}$, $T_{measure,EUTRAN\_Inter}$ and $T_{evaluate,E-UTRAN\_Inter}$ are specified in Table 4.2.2.4-1. For UE configured with eDRX_IDLE cycle, $T_{detect,EUTRAN\_Inter}$, $T_{measure,EUTRAN\_Inter}$ and $T_{evaluate,E-UTRAN\_inter}$ are specified in Table 4.2.2.4-2, where the requirements apply provided that the serving cell is the same in all PTWs during any of $T_{detect,EUTRAN\_Inter}$, $T_{measure,EUTRAN\_Inter}$ and $T_{evaluate,E-UTRAN\_inter}$ when multiple PTWs are used.

TABLE 4.2.2.4-1

$T_{detect,EUTRAN\_Inter}$, $T_{measure,EUTRAN\_Inter}$ and $T_{evaluate,E-UTRAN\_Inter}$

| DRX cycle length [s] | $T_{detect,EUTRAN\_Inter}$ [s] (number of DRX cycles) | $T_{measure,EUTRAN\_Inter}$ [s] (number of DRX cycles) | $T_{evaluate,E-UTRAN\_Inter}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

TABLE 4.2.2.4-2

$T_{detect,EUTRAN\_Inter}$ $T_{measure,EUTRAN\_Inter}$ and $T_{evaluate,\ E\text{-}UTRAN\_inter}$ for UE configured with eDRX_IDLE cycle

| DRX cycle length, DRX [s] | PTW [s] | $T_{detect,EUTRAN\_Inter}$ [s] (number of DRX cycles) | $T_{measure,EUTRAN\_Inter}$ [s] (number of DRX cycles) | $T_{evaluate,E\text{-}UTRAN\_inter}$ [s] (number of DRX cycles) |
|---|---|---|---|---|
| 0.32 | ≥1 | eDRX_cycle_length × $\lceil 23 / \lceil PTW/DRX\_cycle\_length \rceil \rceil$ (23) | 0.32 (1) | 0.64 (2) |
| 0.64 | ≥2 | | 0.64 (1) | 1.28 (2) |
| 1.28 | ≥3 | | 1.28 (1) | 2.56 (2) |
| 2.56 | ≥6 | | 2.56 (1) | 5.12 (2) |

For higher priority cells, a UE may optionally use a shorter value for $T_{measureE\text{-}UTRA\_Inter}$, which shall not be less than Max (0.64 s, one DRX cycle).

For any requirement in this section, when the UE transitions between any two of the states of not being configured with eDRX_IDLE, being configured with eDRX_IDLE cycle, changing eDRX_IDLE cycle length, and changing PTW configuration, the UE shall meet the transition requirement, which is the less stringent requirement of the two requirements corresponding to the first mode and the second mode, during the transition time interval which is the time corresponding to the transition requirement. After the transition time interval, the UE has to meet the requirement corresponding to the second mode.

4.2.2.5 Measurements of Inter-RAT Cells

If Srxlev>$S_{nonIntraSearchP}$ and Squal>$S_{nonIntraSearchQ}$ then the UE shall search for inter-RAT layers of higher priority at least every $T_{higher\_priority\_search}$ where $T_{higher\_priority\_search}$ is described in clause 4.2.2

If Srxlev≤$S_{nonIntraSearchP}$ or Squal≤$S_{nonIntraSearchQ}$ then the UE shall search for and measure inter-RAT layers of higher, lower priority in preparation for possible reselection. In this scenario, the minimum rate at which the UE is required to search for and measure higher priority inter-RAT layers shall be the same as that defined below for lower priority RATs.

For any requirement in section 4.2.2.5, when the UE transitions between any two of the states of not being configured with eDRX_IDLE, being configured with eDRX_IDLE cycle, changing eDRX_IDLE cycle length, and changing PTW configuration, the UE shall meet the transition requirement, which is the less stringent requirement of the two requirements corresponding to the first mode and the second mode, during the transition time interval which is the Elute corresponding to the transition requirements. After the transition time interval, the UE has to meet the requirement corresponding to the second mode.

4.2.2.5.1 Measurements of UTRAN FDD Cells

When the measurement rules indicate that UTRA FDD cells are to be measured, the UE shall measure CPICH Ec/Io and CPICH RSCP of detected UTRA FDD cells in the neighbour frequency list at the minimum measurement rate specified in this section. The UE shall filter CPICH Ec/Io and CPICH RSCP measurements of each measured UTRA FDD cell using at least 2 measurements. Within the set of measurements used for the filtering, at least two measurements shall be spaced by at least half the minimum specified measurement period.

If the UE is not configured with eDRX_IDLE cycle or configured with eDRX_IDLE cycle not longer than 20.48 s. The UE shall evaluate whether newly detectable UTRA FDD cells in normal performance group have met the reselection criteria in TS 36.304 within time ($N_{UTRA\_carrier,normal}$)*$T_{detectUTRA\_FDD}$, and evaluate whether newly detectable UTRA FDD cells in reduced performance group have met the reselection criteria in TS 36.304 within time 6*$N_{UTRA\_carrier,reduced}$*$T_{detectUTRA\_FDD}$ when Srxlev≤$S_{nonIntraSearchP}$ or Squal≤$S_{nonIntrasearchQ}$ when $Treselection_{RAT}$=0 provided that the reselection criteria is met by a margin of at least 6 dB for reselections based on RSCP, or a margin of at least 3 dB for reselections based on Ec/Io. If the UE is configured with eDRX_IDLE cycle longer than 20.48 s, the UE shall evaluate whether newly detectable UTRA FDD cells in normal performance group have met the reselection criteria in TS 36.304 within time ($N_{UTRA\_carrier,normal}$)*$T_{detectUTRA\_FDD}$, and when Srxlev<3 dB or Squal<3 dB evaluate whether newly detectable UTRA FDD cells in reduced performance group have met reselection criteria in TS 36.304 within time 6*$N_{UTRA\_carrier,reduced}$*$T_{detectUTRA\_FDD}$ when Srxlev≤$S_{nonIntraSearchP}$ or Squal≤$S_{nonIntraSearchQ}$ when $Treselection_{RAT}$=0 provided that the reselection criteria is met by a margin of at least 6 dB for reselections based on RSCP, or a margin of at least 3 dB for reselections based on Ec/Io.

If the UE is not configured with eDRX_IDLE cycle or configured with eDRX_IDLE cycle not longer than 20.48 s, cells which have been detected shall be measured at least every ($N_{UTRA\_carrier,normal}$)*$T_{measureUTRA\_FDD}$ for the cells in normal performance group, and at least every 6*$N_{UTRA\_carrier,reduced}$*$T_{measureUTRA\_FDD}$ for the cells in reduced performance group when Srxlev≤$S_{nonIntraSearchP}$ or Squal≤$S_{nonIntraSearchQ}$. If the UE is configured with eDRX_IDLE cycle longer than 20.48 s, cells which have been detected shall be measured at least every ($N_{UTRA\_carrier,normal}$)*$T_{measureUTRA\_FDD}$ for the cells in normal performance group, and when Srxlev<3 dB or Squal<3 dB at least every 6*$N_{UTRA\_carrier,reduced}$*$T_{measureUTRA\_FDD}$ for the cells in reduced performance noun when Srxlev≤$S_{nonIntraSearchP}$ or Squal≤$S_{nonIntraSearchQ}$.

When higher priority UTRA FDD cells are found by the higher priority search, they shall be measured at least every $T_{measure,UTRA\_FDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell.

If the UE is not configured with eDRX_IDLE cycle or configured with eDRX_IDLE cycle not longer than 20.48 s, for a cell that has been already detected, but that has not been reselected to, the filtering shall be such that the UE shall be capable of evaluating that an already identified UTRA FDD cell has met reselection criterion defined in TS 36.304 [1] within $(N_{UTRA\_carrier,normal})*T_{evaluateUTRA\_FDD}$ if the cell is in normal performance group and within $6*N_{UTRA\_carrier,reduced}*T_{evaluateUTRA\_FDD}$ if the cell is in reduced performance group when $T_{reselection}=0$ provided that the reselection criteria is met by a margin of at least 6 dB for reselections based on RSCP, or a margin of at least 3 dB for reselections based on Ec/Io. If the UE k configured with eDRX_IDLE cycle longer than 20.48 s, for a cell that has been already defected, but that has not been reselected to, the filtering shall be such that the UE shall be capable of evaluating that an already identified UTRA FDD cell has met reselection criterion defined in TS 36.304 [1] within $(N_{UTRA\_carrier,normal})*T_{evaluateUTRA\_FDD}$ if the cell is in normal performance group and when Srxlev<3 dB or Squal<3 dB within $6*N_{UTRA\_carrier,reduced}*T_{evaluateUTRA\_FDD}$ if the cell is in reduced performance group when $T_{reselection}=0$ provided that the reselection criteria is met by a margin of at least 6 dB for reselections based on RSCP, or a margin of at least 3 dB for reselections based on Ec/Io.

If $T_{reselection}$ timer has a non zero value and the UTRA FDD cell is satisfied with the reselection criteria which are defined in [1], the UE shall evaluate this UTRA FDD cell for the $T_{reselection}$ time. If this cell remains satisfied with the reselection criteria within this duration, then the UE shall reselect that cell.

For UE not configured with eDRX_IDLE cycle, $T_{detectUTRA\_FDD}$, $T_{measureUTRA\_FDD}$ and $T_{evaluateUTRA\_FDD}$ are specified in Table 4.2.2.5.1-1. For UE configured with eDRX_IDLE cycle, $T_{detectUTRA\_FDD}$, $T_{measureUTRA\_FDD}$ and $T_{evaluateUTRA\_FDD}$ are specified in Table 4.2.2.5.1-2, where the requirements apply provided that the serving cell is the same in all PTWs during any of $T_{detectUTRA\_FDD}$, $T_{measureUTRA\_FDD}$ and $T_{evaluateUTRA\_FDD}$ when multiple PTWs are used.

TABLE 4.2.2.5.1-1

$T_{detectUTRA\_FDD}$, $T_{measureUTRA\_FDD}$, and $T_{evaluateUTRA\_FDD}$

| DRX cycle length [s] | $T_{detectUTRA\_FDD}$ [s] | $T_{measureUTRA\_FDD}$ [s] (number of DRX cycles) | $T_{evaluateUTRA\_FDD}$ [s] (number of DRX cycles) |
|---|---|---|---|
| 0.32 | 30 | 5.12 (16) | 15.36 (48) |
| 0.64 |    | 5.12 (8)  | 15.36 (24) |
| 1.28 |    | 6.4 (5)   | 19.2 (15) |
| 2.56 | 60 | 7.68 (3)  | 23.04 (9) |

TABLE 4.2.2.5.1-2

$T_{detectUTRA\_FDD}$ $T_{measureUTRA\_FDD}$ and $T_{evaluateUTRA\_FDD}$ for UE configured with eDRX_IDLE cycle

| DRX cycle length, DRX [s] | PTW [s] | $T_{detectUTRA\_FDD}$ [s] (number of DRX cycles) | $T_{measureUTRA\_FDD}$ [s] (number of DRX cycles) | $T_{evaluateUTRA\_FDD}$ [s] (number of DRX cycles) |
|---|---|---|---|---|
| 0.32 | ≥1 | eDRX_cycle_length × $\left\lceil \dfrac{23}{\lceil PTW/DRX\_cycle\_length \rceil} \right\rceil$ (23) | 0.96(3) | 2.88 (9) |
| 0.64 | ≥2 | | 1.92(3) | 5.76 (9) |
| 1.28 | ≥3 | | 3.84(3) | 11.52 (9) |
| 2.56 | ≥8 | | 7.68(3) | 23.04 (9) |

For higher priority cells, a UE may optionally use a shorter value for $T_{measureUTRA\_FDD}$, which shall not be less than Max(0.64 s, one DRX cycle).

4.2.2.5.2 Measurements of UTRAN TDD Cells

When the measurement rules indicate that UTRA_TDD cells are to be measured, the UE shall measure P-CCPCH RSCP of detected UTRA_TDD cells in the neighbour frequency list at the minimum measurement rate specified in this section. The UE shall filter P-CCPCH RSCP measurements of each measured UTRA TDD cell using at least 2 measurements. Within the set of measurements used for the filtering, at least two measurements shall be spaced by at least half the minimum specified measurement period. If the UE is not configured with eDRX_IDLE cycle, P-CCPCH RSCP of UTRAN TDD cells shall not be filtered over a longer period than that specified in table 4.2.2.5.2-1. If the UE is configured with eDRX_IDLE cycle, P-CCPCH RSCP of UTRAN TDD cells shall not be filtered over a longer period than that specified in table 4.2.2.5.2-2.

If the UE is not configured with eDRX_IDLE cycle or configured with eDRX_IDLE cycle not longer than 20.48 s, the UE shall evaluate whether newly detectable UTRA_TDD cells in normal performance group have met the reselection criteria in TS 36.304 within time $(N_{UTRA\_carrier\_TDD,normal})*T_{detectUTRA\_TDD}$, and evaluate whether newly detectable UTRA TDD cells in reduced performance group have met the reselection criteria in TS 36.304 within time $6*N_{UTRA\_carrier\_TDD,reduced}*T_{detectUTRA\_TDD}$ when Srxlev≤$S_{nonIntraSearchP}$ or Squal≤$S_{nonIntraSearchQ}$ when $T_{reselection}=0$ provided that the reselection criteria is met by a margin of at least 6 dB. If the UE is configured with eDRX_IDLE cycle longer 20.48 s, the UE shall evaluate whether newly detectable UTRA TDD cells in normal performance group have met the reselection criteria in TS 36.304 within time $(N_{UTRA\_carrier\_TDD,normal})*T_{detectUTRA\_TDD}$, and when Srxlev<3 dB or Squal<3 dB evaluate whether newly detectable UTRA_TDD cells in reduced performance group have met the reselection criteria in TS 36.304 within time $6*N_{UTRA\_carrier\_TDD,reduced}*T_{detectUTRA\_TDD}$ when $Srxlev \leq S_{nonIntraSearchP}$ or $Squal \leq S_{nonIntraSearchQ}$ when $T_{reselection}=0$ provided that the reselection criteria is met by a margin of at east 6 dB.

If the UE is not configured with eDRX_IDLE cycle or configured with eDRX_IDLE cycle not longer than 20.48 s, cells which have been detected shall be measured at least every $(N_{UTRA\_carrier\_TDD,normal})*T_{measureUTRA\_TDD}$ for the cells in normal performance group, and at least every $6*N_{UTRA\_carrier\_TDD,reduced}*T_{measureUTRA\_TDD}$ for the cells in reduced performance group, when $Srxlev \leq S_{nonIntraSearchP}$ or $Squal \leq S_{nonIntraSearchQ}$. If the is configured with eDRX_IDLE cycle longer than 20.48 s, cells which have been detected shall be measured at least every $(N_{UTRA\_carrier\_TDD,normal})*T_{measureUTRA\_TDD}$ for the cells in normal performance group, and when Srxlev< 3 dB or Squal<3 dB at least every $6*N_{UTRA\_carrier\_TDD,reduced}*T_{measureUTRA\_TDD}$ for the cells in reduced performance group, when $Srxlev \leq S_{nonIntraSearchP}$ or $Squal \leq S_{nonIntraSearchQ}$.

When higher priority UTRA TDD cells are found by the higher priority search, they shall be measured at least every $T_{measure,UTRA\_TDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell.

reduced performance group when $T_{reselection}=0$ provided that the reselection criteria is met by a margin of at least 6 dB.

If $T_{reselection}$ timer has a non zero value and the UTRA TDD cell is satisfied with the reselection criteria which are defined in [1], the UE shall evaluate this UTRA TDD cell for the $T_{reselection}$ time. If this cell remains satisfied with the reselection criteria within this duration, then the UE shall reselect that cell.

For UE not configured with eDRX_IDLE cycle, $T_{detectUTRA\_TDD}$, $T_{measureUTRA\_TDD}$ and $T_{evaluateUTRA\_TDD}$ are specified in Table 4.2.2.5.2-1. For UE configured with eDRX_IDLE cycle, $T_{detectUTRA\_TDD}$, $T_{measureUTRA\_TDD}$ and $T_{evaluateUTRA\_TDD}$ are specified in Table 4.2.2.5.2-2, where the requirements apply provided that the serving cell is the same in all PTWs during any of $T_{detectUTRA\_TDD}$, $T_{measureUTRA\_TDD}$ and $T_{evaluateUTRA\_TDD}$ when multiple PTWs are used.

TABLE 4.2.2.5.2-1

$T_{detectUTRA\_TDD}$, $T_{measureUTRA\_TDD}$ and $T_{evaluateUTRA\_TDD}$

| DRX cycle length [s] | $T_{detectUTRA\_TDD}$ [s] | $T_{measureUTRA\_TDD}$ [s] (number of DRX cycles) | $T_{evaluateUTRA\_TDD}$ [s] (number of DRX cycles) |
|---|---|---|---|
| 0.32 | 30 | 5.12 (16) | 15.36 (48) |
| 0.64 |  | 5.12 (8) | 15.36 (24) |
| 1.28 |  | 6.4 (5) | 19.2 (15) |
| 2.56 | 60 | 7.68 (3) | 23.04 (9) |

TABLE 4.2.2.5.2-2

$T_{detectUTRA\_TDD}$ $T_{measureUTRA\_TDD}$ and $T_{evaluateUTRA\_TDD}$ for UE configured with eDRX_IDLE cycle

| DRX cycle length, DRX [s] | PTW [s] | $T_{detectUTRA\_TDD}$ [s] (number of DRX cycles) | $T_{measureUTRA\_TDD}$ [s] (number of DRX cycles) | $T_{evaluateUTRA\_TDD}$ [s] (number of DRX cycles) |
|---|---|---|---|---|
| 0.32 | ≥1 | eDRX_cycle_length × $\left[\frac{23}{\lceil PTW/DRX\_cycle\_length \rceil}\right]$ Note (23) | 0.96(3) | 2.88 (9) |
| 0.64 | ≥2 |  | 1.92(3) | 5.76 (9) |
| 1.28 | ≥4 |  | 3.84(3) | 11.52 (9) |
| 2.56 | ≥8 |  | 7.68(3) | 23.04 (9) |

If the UE is not configured with eDRX_IDLE cycle or configured with eDRX_IDLE cycle not longer than 20.48 s, for a cell that has been already detected, but that has not been reselected to, the filtering shall be such that the UE shall be capable of evaluating that an already identified UTRA TDD cell has met reselection criterion defined in [1] within $N_{UTRA\_carrier\_TDD,normal}*T_{evaluateUTRA\_TDD}$ if the cell is in normal performance group and within $6*N_{UTRA\_carrier\_TDD,reduced}*T_{evaluateUTRA\_TDD}$ if the cell is in reduced performance group when $T_{reselection}=0$ provided that the reselection criteria is met by a margin of at least 6 dB. If the UE is configured with eDRX_IDLE cycle longer than 20.48 s, for a cell that has been already detected, but that has not been reselected to, the filtering shall be such that the UE shad be capable of evaluating that an already identified UTRA_TDD cell has met reselection criterion defined in [1] within $N_{UTRA\_carrier\_TDD,normal}*T_{evaluateUTRA\_TDD}$ if the cell is in normal performance group and when Srxlev< 3 dB or Squal<3 dB within $6*N_{UTRA\_carrier\_TDD,reduced}*T_{evaluateUTRA\_TDD}$ if the cell is in For higher priority cells, a UE may optionally use a shorter value for $T_{measureUTRA\_TDD}$, which shall not be less than Max(0.64 s, one DRX cycle).

4.2.2.5.3 Measurements of GSM Cells

When the measurement rules defined in [1] indicate that E-UTRAN inter-frequencies or inter-RAT frequency cells are to be measured, the UE shall measure the signal level of the GSM BCCH carriers if the GSM BCCH carriers are indicated in the measurement control system information of the serving cell. GSM BCCH carriers of lower priority than the serving cell shall be measured at least every $T_{measure,GSM}$.

When higher priority GSM BCCH carriers are found by the higher priority search, they shall be measured at least every $T_{measure,GSM}$, and the UE shall decode the BSIC of the GSM BCCH carrier. If, after detecting a cell in a higher priority search, it is determined that reselection has not occurred then the UE is not required to continuously measure the detected cell to evaluate the ongoing possibility of reselection, or to continuously verify the BSIC of the GSM BCCH carrier every 30 s. However, the minimum measurement filtering requirements specified later in this clause shall still be met by the UE before it makes any determination that it may stop measuring the cell.

The UE shall maintain a running average of 4 measurements for each GSM BCCH carrier. The measurement samples for each cell shall be as far as possible uniformly distributed over the averaging period.

If continuous GSM measurements are required by the measurement rules in [1], the UE shall attempt to verify the BSIC at least every 30 seconds for each of the 4 strongest GSM BCCH carriers. If a change of BSIC is detected for one GSM cell then that GSM BCCH carrier shall be treated as a new GSM neighbour cell. If the UE detects on a BCCH carrier a BSIC which is indicated as not allowed for that carrier in the measurement control system information of the serving cell, the UE is not required to perform BSIC re-confirmation for that cell.

The UE shall not consider the GSM BCCH carrier in cell reselection, if the UE cannot demodulate the BSIC of that GSM BCCH carrier. Additionally, the UE shall not consider a GSM neighbour cell in cell reselection, if it is indicated as not allowed in the measurement control system information of the serving cell.

If $T_{reselection}$ timer has a non zero value and the GSM cell is satisfied with the reselection criteria which are defined in [1], the UE shall evaluate this GSM cell for the $T_{reselection}$ time. If this cell remains satisfied with the reselection criteria within this duration, then the UE shall reselect that cell.

For UE not configured with eDRX_IDLE cycle, $T_{measure,GSM}$ is specified in Table 4.2.2.5.3-1. For UE configured with eDRX_IDLE cycle. $T_{measure,GSM}$ is specified in Table 4.2.2.5.3-2. where the requirements apply provided that the serving cell is the same in all PTWs during $T_{measure,GSM}$ multiple PTWs are used.

TABLE 4.2.2.5.3-1

$T_{measure,GSM}$,

| DRX cycle length [s] | $T_{measure,GSM}$ [s] (number of DRX cycles) |
|---|---|
| 0.32 | 5.12 (16) |
| 0.64 | 5.12 (8) |
| 1.28 | 6.4 (5) |
| 2.56 | 7.68 (3) |

TABLE 4.2.2.5.3-2

$T_{measure,GSM}$ for UE configured with eDRX IDLE cycle

| DRX cycle length, DRX [s] | PTW [s] | $T_{measure,GSM}$ [s] (number of DRX cycles) |
|---|---|---|
| 0.32 | ≥1 | 3 0.96 (3) |
| 0.64 | ≥2 | 1.92 (3) |
| 1.28 | ≥4 | 3.84 (3) |
| 2.56 | ≥8 | 7.68 (3) |

4.2.2.5.4 Measurements of HRPD Cells

In order to perform measurement and cell reselection to HRPD cell, the UE shall acquire the timing of HRPD cells.

When the measurement rules indicate that HRPD cells are to be measured, the UE shall measure CDMA2000 HRPD Pilot Strength of HRPD cells in the neighbour cell list at the minimum measurement rate specified in this section.

The parameter 'Number of HRPD Neighbor Frequency', which is transmitted on E-UTRAN BCCH, is the number of carriers used for all HRPD cells in the neighbour cell list.

When the E-UTRA serving cell fulfils Srxlev>$S_{nonIntraSearchP}$ and Squal>$S_{nonIntraSearchQ}$, the UE shall search for CDMA2000 HRPD layers of higher priority at least every $T_{higher\_priority\_search}$ where $T_{higher\_priority\_search}$ is defined in clause 4.2.2.

For CDMA2000 HRPD cells which have been detected, the UE shall measure CDMA2000 HRPD Pilot Strength at least every (Number of HRPD Neighbor Frequency)* $T_{measureHRPD}$, when the E-UTRA serving cell Srxlev≤ $S_{nonIntraSearchP}$ or Squal≤$S_{nonIntraSearchQ}$.

The UE shall be capable of evaluating that the CDMA2000 HRPD cell has met cell reselection criterion defined in [1] within $T_{evaluateHRPD}$.

For UE not configured with eDRX_IDLE cycle, Table 4.2.2.5.4-1 gives values of $T_{measureHRPD}$ and $T_{evaluateHRPD}$. For UE configured with eDRX_IDLE cycle, $T_{measureHRPD}$ and $T_{evaluateHRPD}$ are specified in Table 4.2.2.5.4-2, where the requirements apply provided that the serving cells is the same in all PTWs during any of $T_{measureHRPD}$ and $T_{evaluateHRPD}$ when multiple PTWs are used.

TABLE 4.2.2.5.4-1

$T_{measureHRPD}$ and $T_{evaluateHRPD}$

| DRX cycle length [s] | $T_{measureHRPD}$ [s] (number of DRX cycles) | $T_{evaluateHRPD}$ [s] (number of DRX cycles) |
|---|---|---|
| 0.32 | 5.12 (16) | 15.36 (48) |
| 0.64 | 5.12 (8) | 15.36 (24) |
| 1.28 | 6.4 (5) | 19.2 (15) |
| 2.56 | 7.68 (3) | 23.04 (9) |

TABLE 4.2.2.5.4-2

$T_{measureHRPD}$ and $T_{evaluateHRPD}$ for UE configured with eDRX IDLE cycle

| DRX cycle length, DXR [s] | PTW [s] | $T_{measureHRPD}$ [s] (number of DRX cycles) | $T_{evaluatedHRPD}$ [s] (number of DRX cycles) |
|---|---|---|---|
| 0.32 | ≥1 | 4 0.96 (3) | 2.88 (9) |
| 0.64 | ≥2 | 1.92 (3) | 5.76 (9) |
| 1.28 | ≥4 | 3.84 (3) | 11.52 (9) |
| 2.56 | ≥8 | 7.68 (3) | 23.04 (9) |

If $T_{reselection}$ timer has a non zero value and the CDMA2000 HRPD cell is satisfied with the reselection criteria which are defined in [1], the UE shall evaluate this CDMA2000 HRPD cell for the $T_{reselection}$ time. If this cell remains satisfied with the reselection criteria within this duration, then the UE shall reselect that cell.

4.2.2.5.5 Measurements of Cdma2000 1×

In order to perform measurement and cell reselection to cdma2000 1× cell, the UE shall acquire the timing of cdma2000 1× cells.

When the measurement rules indicate that cdma2000 1× cells are to be measured, the UE shall measure cdma2000

1×RTT Pilot Strength of cdma2000 1× cells in the neighbour cell list at the minimum measurement rate specified in this section.

The parameter 'Number of CDMA2000 1× Neighbor Frequency', which is transmitted on E-UTRAN BCCH, is the number of carriers used for all cdma2000 1× cells in the neighbour cell list.

When the E-UTRA serving cell fulfils Srxlev>$S_{nonIntraSearchP}$ and Squal>$S_{nonIntraSearchQ}$, the UE shall search for cdma2000 1× layers of higher priority at least every $T_{higher\_priority\_search}$ where $T_{higher\_priority\_search}$ is defined in clause 4.2.2.

For CDMA2000 1× cells which have been detected, the UE shall measure CDMA2000 1×RTT Pilot Strength at least every (Number of CDMA2000 1× Neighbor Frequency)*$T_{measureCDMA2000\_1x}$, when the E-UTRA serving cell Srxlev≤$S_{nonIntraSearchP}$ or Squal≤$S_{nonIntrasearchQ}$. The UE shall be capable of evaluating that the cdma2000 1× cell has met cell reselection criterion defined in [1] within $T_{evaluateCDMA2000\_1x}$.

For UE not configured with eDRX_IDLE cycle, Table 4.2.2.5.5-1 gives values of $T_{measureCDMA2000\_1x}$ and $T_{evaluateCDMA2000\_1x}$. For UE configured with eDRX_IDLE cycle, $T_{measureCDMA2000\_1x}$ and $T_{evaluateCDMA2000\_1x}$ are specified in Table 4.2.2.5.5-2 where the requirements apply provided that the serving cell is the same in all PTWs during any of $T_{measureCDMA2000\_1x}$ and $T_{evaluateCDMA2000\_1x}$ when multiple PTWs are used.

TABLE 4.2.2.5.5-1

$T_{measureCDMA2000\_1X}$ and $T_{evaluateCDMA2000\_1X}$

| DRX cycle length [s] | $T_{measureCDMA2000\_1X}$ [s] (number of DRX cycles) | $T_{evaluateCDMA2000\_1X}$ [s] (number of DRX cycles) |
| --- | --- | --- |
| 0.32 | 5.12 (16) | 15.36 (48) |
| 0.64 | 5.12 (8) | 15.36 (24) |
| 1.28 | 6.4 (5) | 19.2 (15) |
| 2.56 | 7.68 (3) | 23.04 (9) |

TABLE 4.2.2.5.5-2

$T_{measureCDMA2000\_1X}$ and $T_{evaluateCDMA2000\_1X}$ for UE configured with eDRX IDLE cycle

| DRX cycle length, DRX [s] | PTW [s] | $T_{measureCDMA2000\_1X}$ [s] (number of DRX cycles) | $T_{evaluateCDMA2000\_1X}$ [s] (number of DRX cycles) |
| --- | --- | --- | --- |
| 0.32 | ≥1 | 5 0.96 (3) | 2.88 (9) |
| 0.64 | ≥2 | 1.92 (3) | 5.76 (9) |
| 1.28 | ≥4 | 3.84 (3) | 11.52 (9) |
| 2.56 | ≥8 | 7.68 (3) | 23.04 (9) |

If $T_{reselection}$ timer has a non zero value and the CDMA2000 1× cell is satisfied with the reselection criteria which are defined in [1], the UE shall evaluate this CDMA2000 1× cell for the $T_{reselection}$ time. If this cell remains satisfied with the reselection criteria within this duration, then the UE shall reselect that cell.

4.2.2.6 Evaluation of Cell Re-Selection Criteria

The UE shall evaluate the intra-frequency, inter-frequency and inter-RAT cell reselection criteria defined in [1] at least every DRX cycle. When a non zero value of $T_{reselection}$ is used, the UE shall only perform reselection on an evaluation which occurs simultaneously to, or later than the expiry of the $T_{reselection}$ timer.

For UE configured with eDRX_IDLE cycle, the cell reselection criteria should be evaluated within at least every DRX cycle within the PTW.

4.2.2.7 Maximum Interruption in Paging Reception

UE shall perform the cell re-selection with minimum interruption in monitoring downlink channels for paging reception. When the UE is configured with eDRX_IDLE cycle, the UE shall not miss any paging in a PTW provided the paging is sent in at least [2] DRX cycles before the end of that PTW.

At intra-frequency and inter-frequency cell re-selection, the UE shall monitor the downlink of serving cell for paging reception until the UE is capable to start monitoring downlink channels of the target intra-frequency and inter-frequency cell for paging reception. The interruption time shall not exceed $T_{SI-EUTRA}$+50 ms.

At inter-RAT cell re-selection, the UE shall monitor the downlink of serving cell for paging reception until the UE is capable to start monitoring downlink channels for paging reception of the target inter-RAT cell. For E-UTRAN to UTRA cell re-selection the interruption time must not exceed $T_{SI-UTRA}$+50 ms. For E-UTRAN to GSM cell re-selection the interruption time must not exceed $T_{BCCH}$+50 ms.

$T_{SI-EUTRA}$ is the time required for receiving all the relevant system information data according to the reception procedure and the RRC procedure delay of system information blocks defined in TS 36.331 [2] for a E-UTRAN cell.

$T_{SI-UTRA}$ is the time required for receiving all the relevant system information data according to the reception procedure and the RRC procedure delay of system information blocks defined in [7] for a UTRAN cell.

$T_{BCCH}$ is the maximum time allowed to read BCCH data from a GSM cell defined in [8].

These requirements assume sufficient radio conditions, so that decoding of system information can be made without errors and does not take into account cell re-selection failure.

At cell re-selection to HRPD, the UE shall monitor the downlink of serving cell for paging reception until the UE is capable of starting to monitor downlink channels for paging reception of the target HRPD cell. For HRPD cell re-selection the interruption time must not exceed $T_{SI-HRPD}$+50 ms.

$T_{SI-HRPD}$ is the time required for receiving all the relevant system information data according to the reception procedure and the upper layer (Layer 3) procedure delay of system information blocks defined in [11] in for HRPD cell.

At cell re-selection to cdma2000 1×, the UE shall monitor the downlink of serving cell for paging reception until the UE is capable of starting to monitor downlink channels for paging reception of the target cdma2000 1× cell. For cdma2000 1× cell re-selection the interruption time must not exceed $T_{SI-cdma2000\_1X}$+50 ms.

$T_{SI-cdma2000\_1X}$ is the time required for receiving all the relevant system information data according to the reception procedure and the upper layer (Layer 3) procedure delay of system information blocks defined in [15] for cdma2000 1× cell.

For any requirement in this section, when the UE transitions between any two of the states of not being configured with eDRX_IDLE, being configured with eDRX_IDLE cycle, changing eDRX_IDLE cycle length, and changing PTW configuration, the UE shall meet the transition requirement, which is the less stringent requirement of the two requirements corresponding to the first mode and the second mode, during the transition time interval which is the time corresponding to the transition requirement. After the transition time interval, the UE has to meet the requirement corresponding to the second mode.

4.2.2.8 Void

4.2.2.9 UE Measurement Capability

For idle mode cell re-selection purposes, the UE shall be capable of monitoring at least:
[10] Intra-frequency carrier, and
[11] Depending on UE capability, 3 FDD E-UTRA inter-frequency carriers, and
[12] Depending on UE capability, 3 TDD E-UTRA inter-frequency carriers, and
[13] Depending on UE capability, 3 FDD UTRA carriers, and
[14] Depending on UE capability, 3 TDD UTRA carriers, and
[15] Depending on UE capability, 32 GSM carriers, and
[16] Depending on UE capability, 3 cdma2000 1× carriers, and
[17] Depending on UE capability, 3 HRPD carriers.

In addition to the requirements defined above, a UE supporting E-UTRA measurements in RRC_IDLE state shall be capable of monitoring a total of at least 8 carrier frequency layers, which includes serving layer, comprising of any above defined combination of E-UTRA FDD, E-UTRA_TDD, UTRA FDD, UTRA_TDD, GSM (one GSM layer corresponds to 32 cells), cdma2000 1× and HRPD layers.

[5] 4.2.2.9a UE Measurement Capability (Increased UE Carrier Monitoring)

UE which support Increased UE carrier monitoring E-UTRA according to the capabilities in [2,31] shall be capable of monitoring at least
[18] Depending on UE capability, 8 FDD E-UTRA inter-frequency carriers, and
[19] Depending on UE capability, 8 TDD E-UTRA inter-frequency carriers UE which support increased UE carrier monitoring UTRA according to the capabilities in [2,31] shall additionally be capable of monitoring at least
[20] Depending on UE capability, 6 FDD UTRA carriers, and
[21] Depending on UE capability, 7 TDD UTRA carriers, and In addition to the requirements defined above, a UE supporting E-UTRA measurements in RRC_IDLE state and supporting Increased UE carrier monitoring E-UTRA or increased UE carrier monitoring UTRA according to the capabilities in [2,31] shall be capable of monitoring a total of at least 13 carrier frequency layers, which includes serving layer, comprising of any above defined combination of E-UTRA FDD, E-UTRA_TDD, UTRA FDD, UTRA_TDD, GSM (one GSM layer corresponds to 32 cells), cdma2000 1× and HRPD layers.

The requirements in this section apply for UE disregard of their capability to support eDRX_IDLE.

4.2.2.10 Reselection to CSG Cells

Note: Requirements in this clause are minimum requirements defined to ensure the testability of autonomous CSG search. Further information on autonomous search times in practical deployments is available in [25].

Reselection from non CSG to CSG cells may be performed using UE autonomous search as defined in [1] when at least one CSG ID is included in the UE's CSG whitelist. The requirements in this clause are valid for reselection to CSG cells previously visited by the UE when the radio configuration parameters, including the carrier frequency and physical cell identity of the CSG cell, non CSG cell and other neighbour cells are unchanged from the most recent previous visit.

NOTE: According to [1], the UE autonomous search function, per UE implementation, determines when and/or where to search for allowed CSG cells.

4.2.2.10.1 Reselection from a Non CSG to an Inter-Frequency CSG Cell

The UE shall perform search and reselection to an allowed inter-frequency CSG cell that has met CSG reselection criterion defined in [1] and that is in its whitelist, within 6 minutes in the conditions shown in table 4.2.2.10.1-1. There is no need for statistical testing of this requirement.

TABLE 4.2.2.10.1-1

Parameters for CSG inter-frequency reselection

| Parameter | Unit | Cell 1 | Cell 2 |
|---|---|---|---|
| EARFCN Note 1 | | Channel 1 | Channel 2 |
| CSG indicator | | False | True |
| Physical cell identity Note 1 | | 1 | 2 |
| CSG identity | | Not sent | Sent (Already stored from previous visit) |
| Propagation conditions | | Static, non multipath | |
| CSG cell previously visited by UE | | Yes | |
| PBCH_RA | dB | 0 | 0 |
| PBCH_RB | dB | | |
| PSS_RA | dB | | |
| SSS_RA | dB | | |
| PCFICH_RB | dB | | |
| PHICH_RA | dB | | |
| PHICH_RB | dB | | |
| PDCCH_RA | dB | | |
| PDCCH_RB | dB | | |
| PDSCH_RA | dB | | |
| PDSCH_RB | dB | | |
| OCNG_RA Note 1 | dB | | |
| OCNG_RB Note 1 | dB | | |
| Qrxlevmin | dBm | −140 | −140 |
| $N_{OC}$ | dBm/15 kHz | | Off |
| RSRP Note 2 | dBm/15 KHz | −110 | −110 |

Note 1:
For this requirement to be applicable, the EARFCN and physical cell identity for cell 1 and cell 2 shall be unchanged from when the CSG cell was visited previously
Note 2:
Chosen to ensure that CSG autonomous search has a high probability of success on every attempt made by UE

4.2.2.10.2 Reselection from a Non CSG to an Inter-RAT UTRAN FDD CSG Cell

The UE shall perform search and reselection to an allowed inter-RAT UTRAN FDD CSG cell that has met CSG reselection criterion defined in [1] and that is in its whitelist, within 6 minutes in the conditions shown in table 4.2.2.10.2-1. There is no need for statistical testing of this requirement.

TABLE 4.2.2.10.2-1

Parameters for CSG inter-RAT UTRAN FDD reselection

| Parameter | Unit | Cell 1 | Cell 2 |
|---|---|---|---|
| EARFCN Note 1 | | Channel 1 | N/A |
| UARFCN Note 1 | | N/A | Channel 2 |
| CSG indicator | | False | True |
| Physical cell identity Note 1 | | 1 | N/A |
| Primary scrambling code Note 1 | | N/A | Scrambling code 2 |
| CSG identity | | Not sent | Sent (Already stored in UE whitelist from previous visit) |
| Propagation conditions | | Static, non multipath | |
| CSG cell previously visited by UE | | Yes | |
| PBCH_RA | dB | 0 | N/A |
| PBCH_RB | dB | | |
| PSS_RA | dB | | |
| SSS_RA | dB | | |
| PCFICH_RB | dB | | |
| PHICH_RA | dB | | |
| PHICH_RB | dB | | |
| PDCCH_RA | dB | | |
| PDCCH_RB | dB | | |
| PDSCH_RA | dB | | |
| PDSCH_RB | dB | | |
| OCNG_RA Note 1 | dB | | |
| OCNG_RB Note 1 | dB | | |
| Qrxlevmin | dBm | −140 | |
| $N_{OC}$ | dBm/15 kHz | Off | |
| RSRP Note 2 | dBm/15 KHz | −110 | |
| CPICH_RSCP Note 2 | dBm | N/A | −100 |
| CPICH_Ec/Ior | dB | | −10 |
| PCCPCH_Ec/Ior | dB | | −12 |
| SCCPCH_Ec/Ior | dB | | −12 |
| AICH_Ec/Ior | dB | | −15 |
| SCH_Ec/Ior | dB | | −15 |
| PICH_Ec/Ior | dB | | −15 |
| $I_{OC}$ | dBm/3.84 MHz | | Off |

Note 1:
For this requirement to be applicable, the EARFCN and physical cell identity for cell 1 and the UARFCN and scrambling code for cell 2 shall be unchanged from when the CSG cell was visited previously
Note 2:
Chosen to ensure that CSG autonomous search has a high probability of success on every attempt made by UE

4.3 Minimization of Drive Tests (MDT)

UE supporting minimisation of drive tests in RRC_IDLE shall be capable of:
- [22]—logging measurements in RRC_IDLE, reporting the logged measurements and meeting requirements in this clause;
    logging of RRC connection establishment failure, reporting the logged failure and meeting requirements in this clause;
- [23]—logging of radio link failure and handover failure, reporting the logged failure and meeting requirements in this clause.

4.3.1 Introduction

The logged MDT requirements consist of measurement requirements as specified in clause 4.3.2 and relative time stamp accuracy requirements as specified in clause 4.3.3. Both sets of requirements are applicable for intra-frequency, inter-frequency and inter-RAT cases in RRC_IDLE state. The MDT procedures are described in [27].

For RRC connection establishment failure logging and reporting, the MDT requirements consist of requirements for measurements performed and logged in RRC_IDLE state specified in clause 4.3.2 and relative time stamp accuracy requirement for RRC connection establishment failure log reporting as specified in clause 4.3.4.

4.3.2 Measurements

The requirements specified in this clause apply for the measurements (GSM carrier RSSI, UTRA CPICH RSCP, UTRA CPICH Ec/Io, P-CCPCH RSCP for UTRA 1.28 TDD, E-UTRA RSRP, E-UTRA RSRQ, MBSFN RSRP, MBSFN RSRQ, and MCH BLER) performed and logged by the UE for MDT in RRC_IDLE. The requirements apply for the measurements included in logged MDT reports and RRC connection establishment failure reports.

4.3.2.1 Requirements

The measurement values that are used to meet
- [24]—serving cell and reselection requirements as specified in sections 4.2.2.1, 4.2.2.3, 4.2.2.4, 4.2.2.5,
- [25]—MBSFN measurement requirements as specified in section 4.4, shall also apply to values logged for MDT measurements in RRC_IDLE state.

4.3.3 Relative Time Stamp Accuracy

The relative time stamp for a logged measurement is defined as the time from the moment the MDT configuration was received at the UE until the measurement was logged, see TS 36.331 [2].

4.3.3.1 Requirements

The accuracy of the relative time stamping is such that the drift of the time stamping shall be not more than ±2 seconds per hour.

4.3.4 Relative Time Stamp Accuracy for RRC Connection Establishment Failure Log Reporting Relative time stamp for RRC connection establishment failure log reporting is defined as the time elapsed from the last RRC connection establishment failure to the time when the log is included in the report TS 36.331 [2]. The UE shall report the RRC connection establishment failure log, while meeting the accuracy requirement specified in clause 4.3.4.1.

4.3.4.1 Requirements

The accuracy of the relative time stamping for RRC connection establishment failure log reporting is such that the drift of the time stamping shall not be larger than ±0.72 seconds per hour and ±10 seconds over 48 hours. The relative time stamp accuracy requirements shall apply provided that:
- [26]—no power off or detach occurs after the RRC connection establishment failure had been detected and until the log is time-stamped.

NOTE: This requirement does not need to be tested.

4.3.5 Relative Time Stamp Accuracy for Radio Link Failure and Handover Failure Log Reporting The UE shall report the radio link and handover failure log, while meeting the accuracy requirements specified in this section.

4.3.5.1 Requirements for timeSinceFailure

Relative time stamp accuracy requirements for timeSinceFailure reported for MDT in a radio link failure or handover failure log are specified in this clause. timeSinceFailure determines the time elapsed from the last radio link failure or handover failure in E-UTRA to the time when the log is included in the report TS 36.331 [2].

The accuracy of the relative time stamping for timeSinceFailure is such that the drift of the time stamping shall not be larger than ±0.72 seconds per hour and ±10 seconds over 48 hours. These relative time stamp accuracy requirements shall apply provided that:
- [27]—no power off or detach occurs after the RLF or handover failure had been detected and until the log is time-stamped.

4.4 MBSFN Measurements

4.4.1 Introduction

The requirements specified in Section 4.4 apply for MBSFN measurements (MBSFN RSRP, MBSFN RSRQ, and MCH BLER defined in [4]), which are performed in RRC_IDLE state and logged for MDT by UEs which are MBMS-capable and also indicate their MBSFN measurement logging capability [2].

UE shall measure MBSFN RSRP, MBSFN RSRQ and MCH BLER only in subframes and on carriers where UE is decoding PMCH. The requirements are specified for any carrier where PMCH is received by UE. The requirements specified in this section apply for any carrier frequency with configured MBSFN subframes with PMCH, which may be the same as or different from any serving unicast carrier.

The UE receiving PMCH on any non-serving carrier and performing MBSFN measurements shall not cause interruptions on any serving carrier in the subframes with paging and non-MBSFN multicast transmissions such as system information.

4.4.2 MBSFN RSRP Measurements

For UE in RRC_IDLE, the physical layer shall be capable of performing the MBSFN RSRP measurement [4] within the MBSFN RSRP measurement period and log the measurement, while meeting the MBSFN RSRP measurement accuracy requirements specified in section 9.8.2. The MBSFN RSRP measurement logging shall be according to the MBSFN RSRP measurement report mapping specified in Section 9.8.2.2.

When the UE is not configured with eDRX_IDLE cycle, the MBSFN RSRP measurement period is defined as MAX (640 ms, period during which the UE decodes [5, Section 10] 5 subframes containing PMCH transmissions).

When the DE is using eDRX_IDLE cycle, the MBSFN RSRP measurement period is defined as MAX(one eDRX_IDLE cycle, period during which the UE decodes [5, Section 10] 5 subframes containing PMCH transmissions).

4.4.3 MBSFN RSRQ Measurements

For UE in RRC_IDLE, the physical layer shall be capable of performing the MBSFN RSRQ measurement [4] within the MBSFN RSRP measurement period and report the measurement, while meeting the MBSFN RSRQ measurement accuracy requirements specified in section 9.8.3. The MBSFN RSRQ measurement logging shall be according to the MBSFN RSRQ measurement report mapping specified in Section 9.8.3.2.

When the UE is not configured with eDRX_IDLE cycle, the MBSFN RSRQ measurement period defined as MAX (640 ms, period during which the UE decodes [5, Section 10] 5 subframes containing PMCH transmissions).

When the UE is using eDRX_IDLE cycle, the MBSFN RSRQ measurement period is defined as MAX(one eDRX_IDLE cycle, the period during which the UE decodes [5, Section 10] 5 subframes containing PMCH transmissions).

4.4.4 MCH BLER Measurements

The UE physical layer shall be capable of performing and logging the MCH BLER measurement [4] within the MCH BLER measurement period.

The MCH BLER measurement period is equal to MAX (one eDRX_IDLE cycle, MBSFN logging interval configured by higher layers [2]).

The MCH BLER logging shall be according to the MCH BLER measurement report mapping specified in Section 98.4.

The following acronyms are used throughout this disclosure.

2G Second Generation
3G Third Generation
3GPP Third Generation Partnership Project
5G Fifth Generation
ACK Acknowledgement
A/D Analog-to-Digital
ASIC Application Specification Integrated Circuit
BLER Block Error Rate
CA Carrier Aggregation
CC Component Carrier
CGI Cell Global Identifier
CoMP Coordinated Multi-Point
CPU Central Processing Unit
CQI Channel Quality Indicator
CRS Cell Specific Reference Signal
CSI Channel State Information
CSI-RSRP Reference Symbol Received Power using Channel State Information Reference Symbols
DAS Distributed Antenna System
dBm Decibel-Milliwatt
DL-SCH Downlink Shared Channel
DRX Discontinuous Reception
DSP Digital Signal Processor
ECGI Evolved Universal Terrestrial Radio Access Cell Global Identifier
eDRX Extended Discontinuous Reception
eNB Evolved Node B
E-UTRA Evolved Universal Terrestrial Radio Access
E-UTRAN Evolved Universal Terrestrial Radio Access Network
FDD Frequency Division Duplexing
FPGA Field Programmable Gate Array
GCI Global Cell Identifier
GPS Global Positioning System
GSM Global System for Mobile Communications
HARQ Hybrid Automatic Repeat Request
HBS Home Base Station
HPN High Power Node H-SFN Hyper System Frame Number
ID Identifier
IDC In-Device Co-Existence
IMSI International Mobile Subscriber Identity
km Kilometer
LPN Low Power Node
LTE Long-Term Evolution
m Meter
M2M Machine-to-Machine
MAC Medium Access Control
MDT Minimization of Drive Tests
MIB Master Information Block
MME Mobility Management Entity
ms Millisecond
MTC Machine Type Communication
NACK Negative Acknowledgement
NAS Non-Access Stratum
NB-IoT Narrowband Internet of Things
ns Nanosecond
PBCH Physical Broadcast Channel
PCC Primary Component Carrier
PCell Primary Cell
PCFICH Physical Control Format Indicator Channel
PCI Physical Cell Identifier
PDCCH Physical Downlink Control Channel
PDSCH Physical Downlink Shared Channel
PF Paging Frame
P-GW Packet Data Network Gateway
PH Paging Hyper System Frame Number
PHICH Physical Hybrid Automatic Repeat Request Indicator Channel
PMI Precoding Matrix Indicator
PRS Positioning Reference Signal
PO Paging Occasion
PS Packet-Switched
PSC Primary Serving Cell
PSS Primary Synchronization Signal
PTW Paging Time Window
QoS Quality of Service
RAM Random Access Memory
RAN Radio Access Network
RAT Radio Access Technology
RLF Radio Link Failure
RLM Radio Link Monitoring
RRC Radio Resource Control
RRH Remote Radio Head
RRM Radio Resource Management
RRU Remote Radio Unit
RS-SINR Reference Signal Signal to Interference plus Noise Ratio
RSRP Reference Symbol Received Power
RSRQ Reference Symbol Received Quality
RSTD Reference Signal Time Difference
RTT Round Trip Time
Rx Reception
SCC Secondary Component Carrier
SCell Secondary Cell
SFN System Frame Number
S-GW Serving Gateway
SI System Information
SIB1 System Information Block Type 1
SIB3 System Information Block Type 3
SINR Signal to Interference plus Noise Ratio
SNR Signal to Noise Ratio
SON Self-Organizing Network
SSC Secondary Serving Cell
SSS Secondary Synchronization Signal
TDD Time Division Duplexing
TOA Time of Arrival
TP Transmit Point
TS Technical Specification
Tx Transmission
U-CGI Universal Terrestrial Radio Access Cell Global Identifier
UE User Equipment
UTRA Universal Terrestrial Radio Access
UTRAN Universal Terrestrial Radio Access Technology
VoIP Voice over Internet Protocol
VPN Virtual Private Network
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a wireless communication device configured to operate with an extended Discontinuous Reception, eDRX, cycle, comprising:
   acquiring a first identifier of at least one first cell during a time associated with a first paging time window of the eDRX cycle with which the wireless communication device is configured;
   acquiring a second identifier of at least one second cell during a time associated with a second paging time window of the eDRX cycle with which the wireless communication device is configured, the second paging time window occurring subsequent to the first paging time window and the at least one second cell being at least one strongest cell as measured by the wireless communication device;
   performing a first type of wireless communication device radio operations if the first identifier is the same as the second identifier; and
   performing a second type of wireless communication device radio operations if the first identifier is different than the second identifier;
   wherein the first identifier of the at least one first cell is a first Cell Global Identifier, CGI, of the at least one first cell and the second identifier of the at least one second cell is a second CGI of the at least one second cell.

2. The method of claim 1 wherein the at least one first cell is at least one serving cell of the wireless communication device.

3. The method of claim 1 wherein the time associated with the first paging time window is one of a time during the first paging time window, a time immediately before the first paging time window, and a time immediately after the first paging time window.

4. The method of claim 1 wherein the time associated with the second paging time window is one of a time during the second paging time window and a time immediately before the second paging time window.

5. The method of claim 1 wherein:
   the at least one first cell is at least one serving cell of the wireless communication device; and
   the first type of wireless communication device radio operations are wireless communication device radio operations performed on the at least one second cell that are the same as those performed by the wireless communication device on the at least one serving cell when the wireless communication device was served by the at least one serving cell during the first paging time window.

6. The method of claim 1 wherein the at least one first cell is at least one serving cell of the wireless communication device, and performing the first type of wireless communication device radio operations if the first identifier is the same as the second identifier comprises performing one or more radio measurements on signals of the at least one second cell.

7. The method of claim 1 wherein the at least one first cell is at least one serving cell of the wireless communication device, and performing the first type of wireless communication device radio operations if the first identifier is the same as the second identifier comprises performing one or more radio measurements on signals of one or more neighbor cells.

8. The method of claim 1 wherein the at least one first cell is at least one serving cell of the wireless communication device, and performing the first type of wireless communication device radio operations if the first identifier is the same as the second identifier comprises performing, on the at least one second cell, one or more tasks related to a serving cell of the wireless communication device.

9. The method of claim 1 wherein the at least one first cell is at least one serving cell of the wireless communication device, and performing the first type of wireless communication device radio operations if the first identifier is the same as the second identifier comprises performing at least one of a group consisting of:
  performing Radio Link Monitoring, RLM, on signals of the at least one second cell;
  receiving of one or more control channels of the at least one second cell;
  transmitting signals to and/or receiving signals from the at least one second cell based on scheduling information received from a network node; and
  sending an indication to a network node that informs the network node that the at least one first cell and the at least one second cell are the same.

10. The method of claim 1 wherein the at least one first cell is at least one serving cell of the wireless communication device, and performing the second type of wireless communication device radio operations if the first identifier is different than the second identifier comprises performing at least one of a group consisting of:
  refraining from performing RLM on signals of the at least one second cell;
  ignoring any scheduling grant received from the at least one second cell;
  refraining from transmitting any data in an uplink on the at least one second cell;
  entering idle mode if the wireless communication device is in a connected state;
  determining whether the wireless communication device needs to change a tracking area or registration area of the wireless communication device based on whether the at least one second cell belongs to a different tracking area or registration area as compared to that of the at least one first cell;
  performing a tracking area update if the at least one second cell does not belong to a previous tracking area of the wireless communication device;
  initiating a connection reestablishment to re-establish a connection to the at least one second cell as at least one new serving cell of the wireless communication device;
  sending an indication to a network node that informs the network node that the at least one first cell and the at least one second cell are different; and
  sending measurement results of measurements performed on the at least one second cell to a network node.

11. The method of claim 1 further comprising:
  acquiring a third identifier of a first transmitter associated with the at least one first cell during a time associated with the first paging time window of the eDRX cycle with which the wireless communication device is configured;
  acquiring a fourth identifier of a second transmitter associated with the at least one second cell during a time associated with the second paging time window of the eDRX cycle with which the wireless communication device is configured;
  performing a third type of wireless communication device radio operations if the third identifier is the same as the fourth identifier; and
  performing a fourth type of wireless communication device radio operations of the third identifier is different than the fourth identifier.

12. The method of claim 11 wherein:
  the at least one first cell is at least one first shared cell having a plurality of first transmit points, and the first transmitter is a transmit point from among the plurality of first transmit points that satisfies a first predefined criteria; and
  the at least one second cell is at least one second shared cell having a plurality of second transmit points, and the second transmitter is a transmit point from among the plurality of second transmit points that satisfies a second predefined criteria.

13. The method of claim 12 wherein:
  the first predefined criteria is being a strongest transmit point as measured by the wireless communication device from among the plurality of first transmit points or not being weaker than a first predefined threshold; and
  the second predefined criteria is being a strongest transmit point as measured by the wireless communication device from among the plurality of second transmit points or not being weaker than a second predefined threshold.

14. The method of claim 11 wherein performing the third type of wireless communication device radio operations if the third identifier is the same as the fourth identifier comprises performing at least one of a group consisting of:
  performing RLM on signals of the second transmitter;
  performing one or more radio measurements on signals of the second transmitter;
  performing one or more radio measurements on signals of one or more neighbor cells;
  receiving one or more control channels of the second transmitter;
  transmitting signals to and/or receiving signals from the second transmitter based on scheduling information received from a network node;
  sending an indication to a network node that informs the network node that the first transmitter and the second transmitter are the same; and
  performing, on the second transmitter, one or more tasks related to a serving cell of the wireless communication device.

15. The method of claim 11 wherein performing the fourth type of wireless communication device radio operations if the third identifier is different than the fourth identifier comprises performing at least one of a group consisting of:
  refraining from performing RLM on signals of the second transmitter;

ignoring any scheduling grant received from the second transmitter;

refraining from transmitting any data in an uplink to the second transmitter;

entering idle mode if the wireless communication device is in a connected state;

determining whether the wireless communication device needs to change a tracking area or registration area of the wireless communication device based on whether the second transmitter belongs to a different tracking area or registration area as compared to that of the first transmitter;

performing a tracking area update if the second transmitter does not belong to a previous tracking area of the wireless communication device;

initiating a connection reestablishment to re-establish a connection to the second transmitter as a serving transmit point of the wireless communication device;

sending an indication to a network node that informs the network node that the first transmitter and the second transmitter are different; and sending measurement results of measurements performed on the second transmitter to a network node.

16. A wireless communication device configured to operate with an extended Discontinuous Reception, eDRX, cycle, the wireless communication device adapted to:

acquire a first identifier of at least one first cell during a time associated with a first paging time window of the eDRX cycle with which the wireless communication device is configured;

acquire a second identifier of at least one second cell during a time associated with a second paging time window of the eDRX cycle with which the wireless communication device is configured, the second paging time window occurring subsequent to the first paging time window and the at least one second cell being at least one strongest cell as measured by the wireless communication device;

perform a first type of wireless communication device radio operations if the first identifier is the same as the second identifier; and perform a second type of wireless communication device radio operations if the first identifier is different than the second identifier;

wherein the first identifier of the at least one first cell is a first Cell Global Identifier, CGI, of the at least one first cell and the second identifier of the at least one second cell is a second CGI of the at least one second cell.

17. A wireless communication device configured to operate with an extended Discontinuous Reception, eDRX, cycle, comprising:

a transceiver;

one or more processors;

memory comprising instructions executable by the one or more processors whereby the wireless communication device is operable to:

acquire a first identifier of at least one first cell during a time associated with a first paging time window of the eDRX cycle with which the wireless communication device is configured;

acquire a second identifier of at least one second cell during a time associated with a second paging time window of the eDRX cycle with which the wireless communication device is configured, the second paging time window occurring subsequent to the first paging time window and the at least one second cell being at least one strongest cell as measured by the wireless communication device;

perform a first type of wireless communication device radio operations if the first identifier is the same as the second identifier; and perform a second type of wireless communication device radio operations if the first identifier is different than the second identifier;

wherein the first identifier of the at least one first cell is a first Cell Global Identifier, CGI, of the at least one first cell and the second identifier of the at least one second cell is a second CGI of the at least one second cell.

* * * * *